US006286034B1

United States Patent
Sato et al.

(10) Patent No.: US 6,286,034 B1
(45) Date of Patent: *Sep. 4, 2001

(54) COMMUNICATION APPARATUS, A COMMUNICATION SYSTEM AND A COMMUNICATION METHOD

(75) Inventors: Hiroaki Sato; Kenichiro Tanaka, both of Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/701,850

(22) Filed: Aug. 23, 1996

(30) Foreign Application Priority Data

Aug. 25, 1995 (JP) .................................... 7-217403
Aug. 25, 1995 (JP) .................................... 7-217404
Feb. 2, 1996 (JP) .................................... 8-017654

(51) Int. Cl.[7] .................................................. G06F 15/16
(52) U.S. Cl. ............................................ 709/204; 709/205
(58) Field of Search ........................ 395/200.34, 200.47, 395/200.59; 370/260, 484; 345/330; 709/204, 217, 226, 229, 205; 380/257; 379/202

(56) References Cited

U.S. PATENT DOCUMENTS

| 5,003,593 | * | 3/1991 | Mihm, Jr. | 380/21 |
| 5,220,657 | * | 6/1993 | Bly et al. | 395/425 |
| 5,408,250 | * | 4/1995 | Bier | 345/169 |
| 5,440,624 | * | 8/1995 | Schoof, II | 379/202 |
| 5,539,886 | * | 7/1996 | Aldred et al. | 395/200.04 |
| 5,619,555 | * | 4/1997 | Fenton et al. | 379/67 |
| 5,657,096 | * | 8/1997 | Lukacs | 348/585 |
| 5,793,967 | * | 8/1998 | Simciak et al. | 395/200.34 |
| 5,805,846 | * | 9/1998 | Nakajima et al. | 395/330 |
| 5,852,656 | * | 12/1998 | Sato et al. | 379/93.21 |
| 5,903,629 | * | 5/1999 | Campbell, IV et al. | 379/88.24 |

* cited by examiner

Primary Examiner—Mehmet B. Geckil
(74) Attorney, Agent, or Firm—Fitzpatrick, Cella, Harper & Scinto

(57) ABSTRACT

A standardized user interface that can handle a system for cooperatively performing various tasks. Session contents display sections display information concerning sessions using display forms that are consonant with session types. The list of the session contents display sections is displayed by a session list display section, and information concerning the sessions can be displayed for each session. Since the session contents display sections detect the input of instructions for session operations, various types of sessions can be held using a standardized user interface. In addition, the generation and extinguishing of sessions can be performed by the session operation unit, and contents of the session information that is collectively managed by the session information update detecting unit can be reflected in the session contents display section of an individual terminal. Furthermore, all of the events initiated by a user can be handled by a control unit.

15 Claims, 26 Drawing Sheets

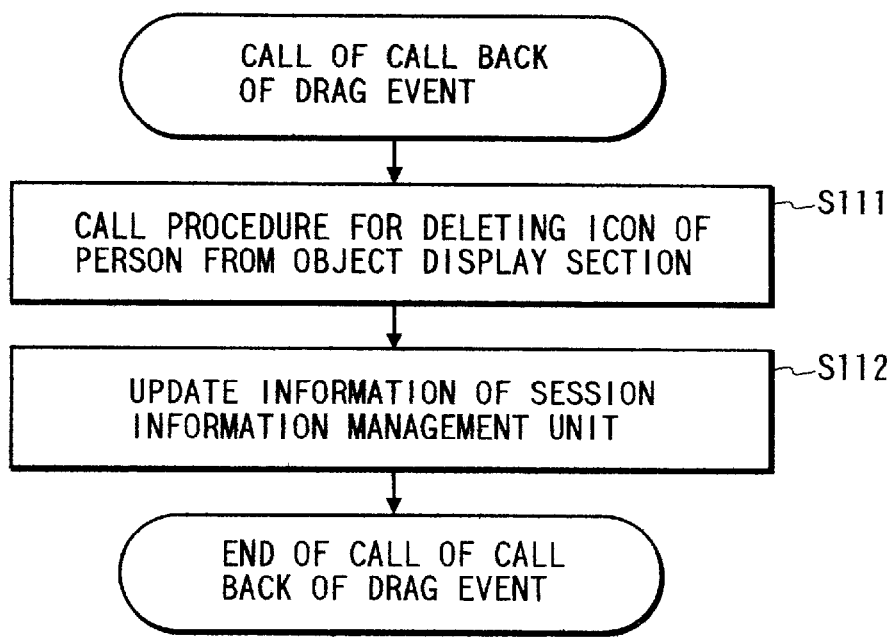
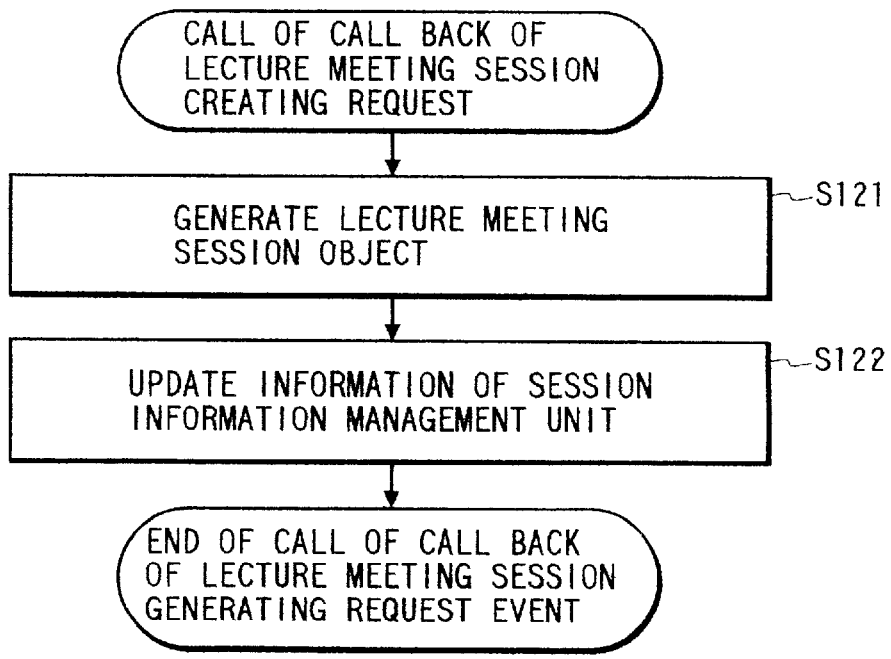

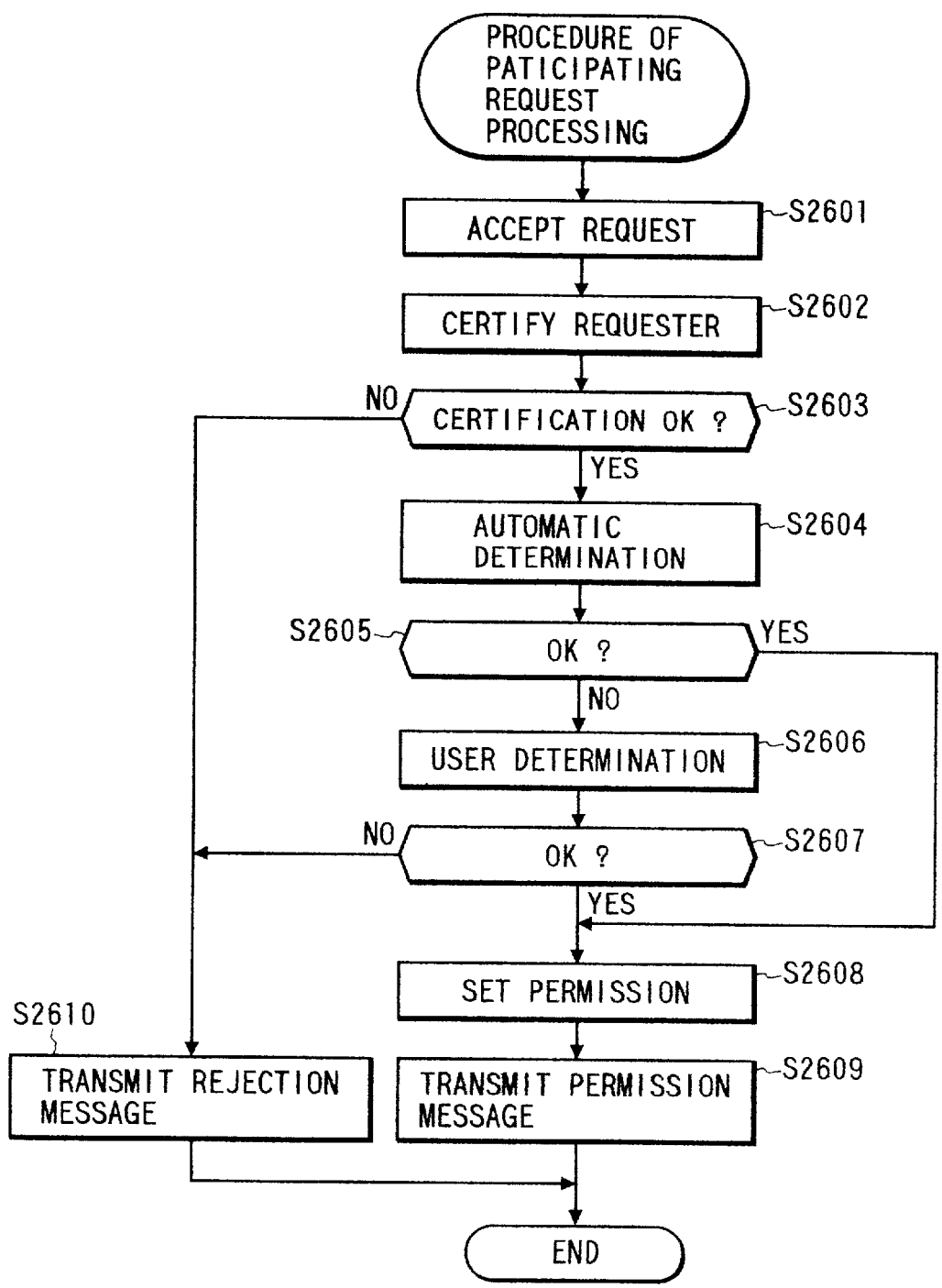

FIG. 27A

REQUEST FOR PARTICIPATION IN CONFERENCE
SESSION 001 IS COMING FROM Mr. Sato.

2701     2702

[ PARTICIPATE ]     [ NOT PARTICIPATE ]

FIG. 27B

Sato WISHES TO PARTICIPATE IN CONFERENCE
SESSION 001.

2703     2704

[ PERMIT ]     [ REJECT ]

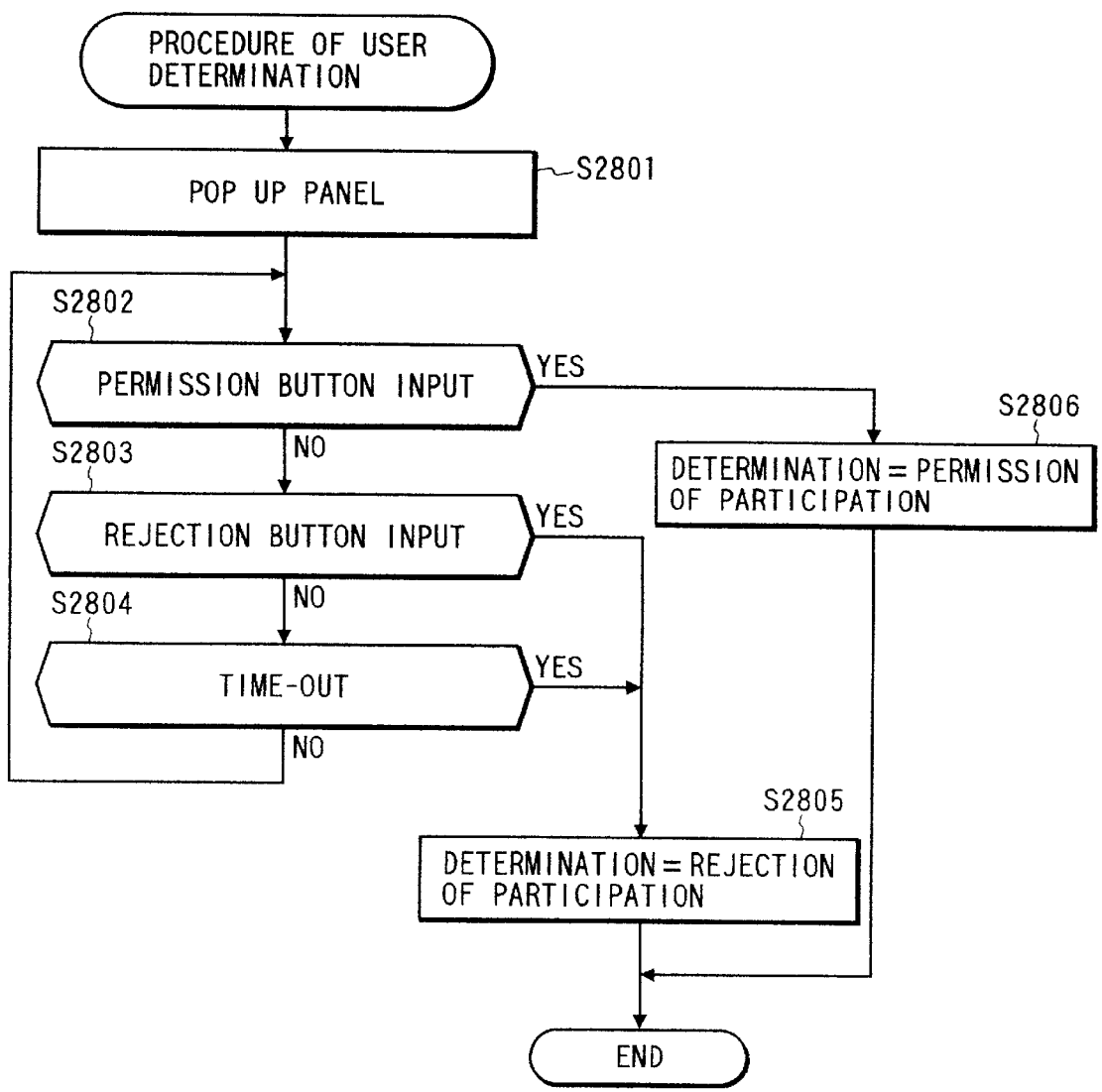

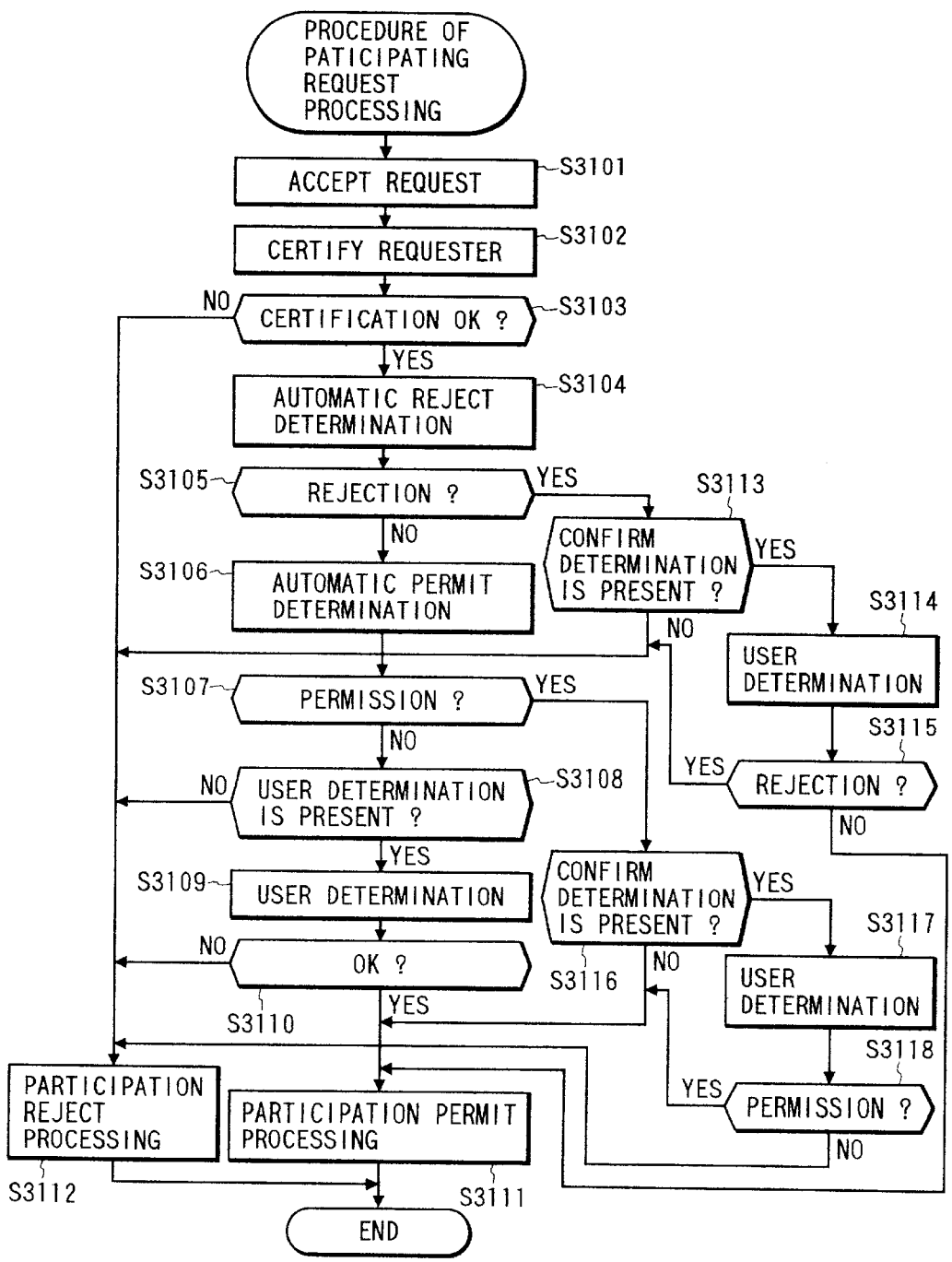

COMMUNICATION APPARATUS, A COMMUNICATION SYSTEM AND A COMMUNICATION METHOD

BACKGROUND OF THE INVENTION

1. Field of the Invention

The present invention relates to a communication apparatus, a communication system, and a communication method for performing a task involving the cooperative employment of a plurality of networked terminals that are remotely located.

2. Related Background Art

Conventionally, a variety of tasks are cooperatively performed by persons at remote locations while using systems comprising a plurality of terminals that are joined together to form networks. A conventional system is created for each task that constitutes a cooperative effort (session). That is, a remote conference convening system is activated convening a remote conference, a remote lecture assembly system is activated for presenting a remote lecture, and a status evaluation system is activated for evaluating existing conditions.

These systems are independently developed, and the user interfacing specifications for each of them differ.

When an independent system is created for each task that involves a cooperative effort, it is not possible to smoothly shift the performance of one task to another.

For example, when a user is performing a task that involves using the status evaluation system to obtain an understanding of the status of a person located at a remote side, and he or she desires to converse with that person, the user must activate a conversation participation system.

Since the user interface specifications differ from system to system, the user must understand all of the user interface specifications for all of the systems he or she uses.

As a security problem that is conventionally encountered, a conventional system can not clearly distinguish between the access management procedures that apply when a third party is to participate in a session and the privacy management procedures that apply when a third party is to be provided information concerning the session. Therefore, a conventional system can not adequately respond to a request for information concerning a session when participation in the session is not contemplated.

As another security problem, since conventionally a plurality of terminals are employed and are used in common during a session in which static images are mutually transmitted, the reception programs at all of the receiving terminals access and display data output by a transmission program that is employed at one terminal. In this case, when the transmission and reception programs are intended for a special application, such as for a video conference, special authentication means and operation rejection and acceptance means are provided for the transmission and the reception programs, so that a system having no security problem can be provided.

Further, in order to use in common a general program, not a special one, among a plurality of terminals networked for a video conference, or to eliminate the labor involved in creating a special reception program, a display instruction from a general program that is operating on one terminal may be received by general-purpose display programs at the other, individual terminals, which thereafter display the data they receive. This reception and display operation is accomplished at a workstation by using a server program, a so-called window server.

Besides window servers, file I/O servers are popular server programs that provide some services in response to external requests. A file I/O server may, for example, respond to an external request by transferring data from a file to a requesting person. But since the file I/O servers, as well as the window servers, have not been developed for the purpose of supporting the convening of video conferences, setups by which access of conference is enabled can not be provided, with the result that the security procedures are either excessively strict, such as one that requires the use of a password by each participant, or they are excessively lax, such as one that grants access to anybody.

A window server, for example, includes a procedure for designating users to whom operating permission is to be provided, so as to prevent the execution of display instructions that are issued by unauthorized persons. Since the persons for whom communication is authorized can not be selected in advance when a window server is employed for a video conference, the server is so set that it permits the execution of display instructions it receives from any person.

SUMMARY OF THE INVENTION

It is therefore one object of the present invention to provide a communication apparatus that has a preferable usability for operating a plurality of sessions, and a communication system and a communication method therefor.

It is another object of the present invention to provide a communication apparatus that can easily ascertain whether access to a session is required or not, and a communication system and a communication method therefor.

It is an additional object of the present invention to provide a communication apparatus that can identify a request for access and that, in response to the access request, can appropriately determine whether or not it is possible to permit access, and a communication system and a communication method therefor.

It is a further object of the present invention to provide a communication apparatus that has an innovative function, and a communication system and a communication method therefor.

By referring to the following embodiments and drawings, other features of the present invention will become readily apparent.

BRIEF DESCRIPTION OF THE DRAWINGS

FIG. 10 is a flowchart of the processing for a function for calling back a drag event for a conversation session object;

FIG. 11 is a flowchart of the processing for each function for calling back a lecture assembly session creating request event;

FIG. 26 is a flowchart of the participation request processing for a video conference system that employs the present invention;

FIGS. 27A and 27B are diagrams illustrating a panel that is displayed on a screen at user determination step S206;

FIG. 28 is a flowchart of the detailed processing for the user determination step S206;

FIG. 31 is a flowchart of the processing for a fifth embodiment of the present invention.

DETAILED DESCRIPTION OF THE PREFERRED EMBODIMENTS

The preferred embodiments of the present invention will now be described while referring to the accompanying drawings.

Figure 1A:
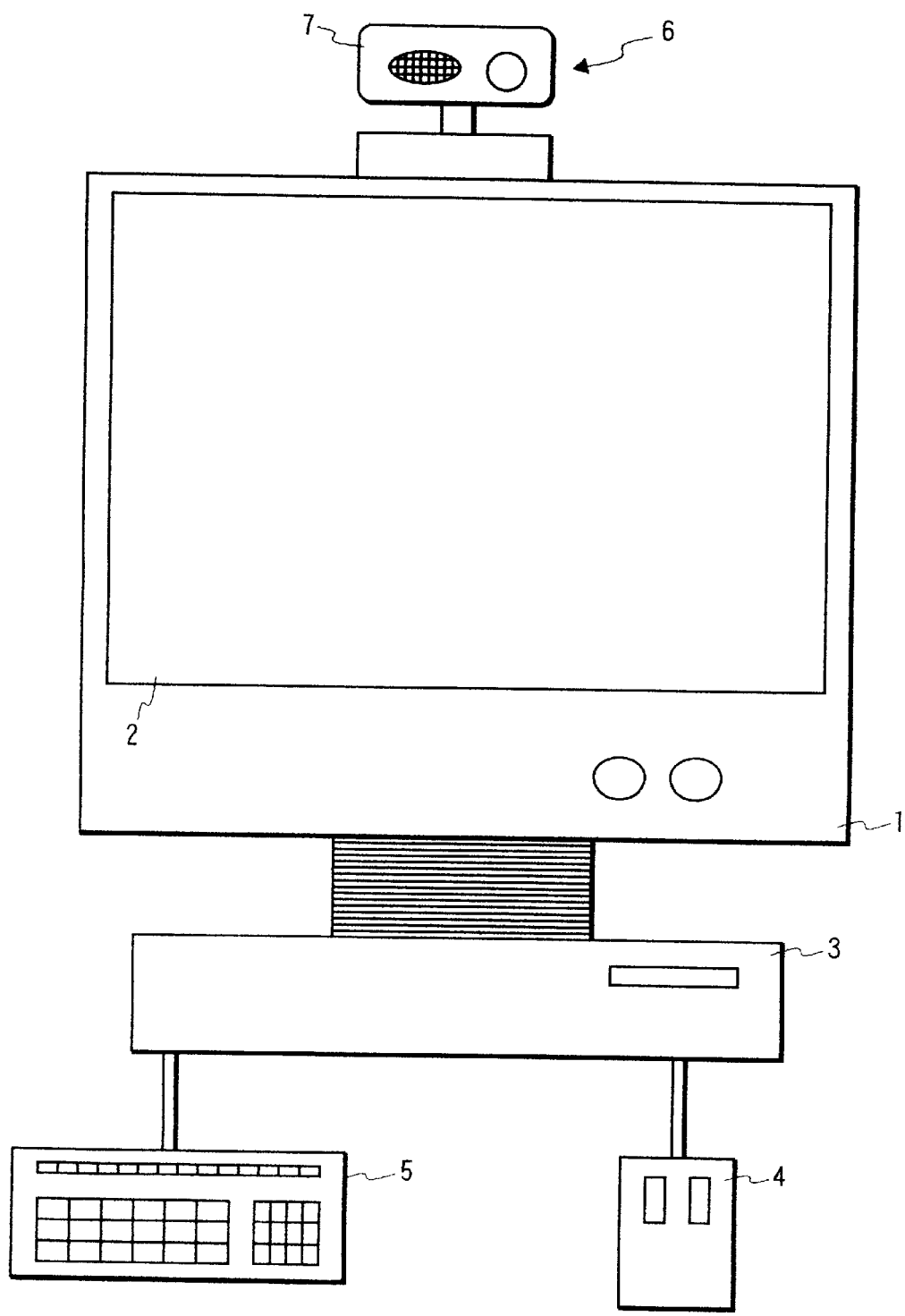
FIGS. 1A and 1B are diagrams illustrating the structure of a session operation apparatus according to a first embodiment of the present invention.

FIG. 1A is a diagram illustrating the external appearance of a session operation apparatus according to a first embodiment of the present invention. It should be noted that sessions in this embodiment and in embodiments that will be described later are performed by using communication equipment to connect together the apparatuses in FIG. 1A.

In FIG. 1A, a display device 1 displays a user interface, which will be described later, an image acquired by the camera of an apparatus of another participant in a session, and a camera control interface. Reference numeral 2 denotes a display portion. A main body 3 includes a terminal 10 in FIG. 1B that will be described later. Pointing devices 4 and 5 are a mouse or a keyboard for inputting a user event.

A camera 6 is employed to capture a likeness of a user that operates the session operation apparatus. The camera 6 can be remotely controlled, by means of a camera control interface that will be described later, by a user at another apparatus.

A microphone 7 is attached to the camera 6, and audio volume can be remotely controlled, using the camera control interface, by the user at the other apparatus.

Figure 1B:
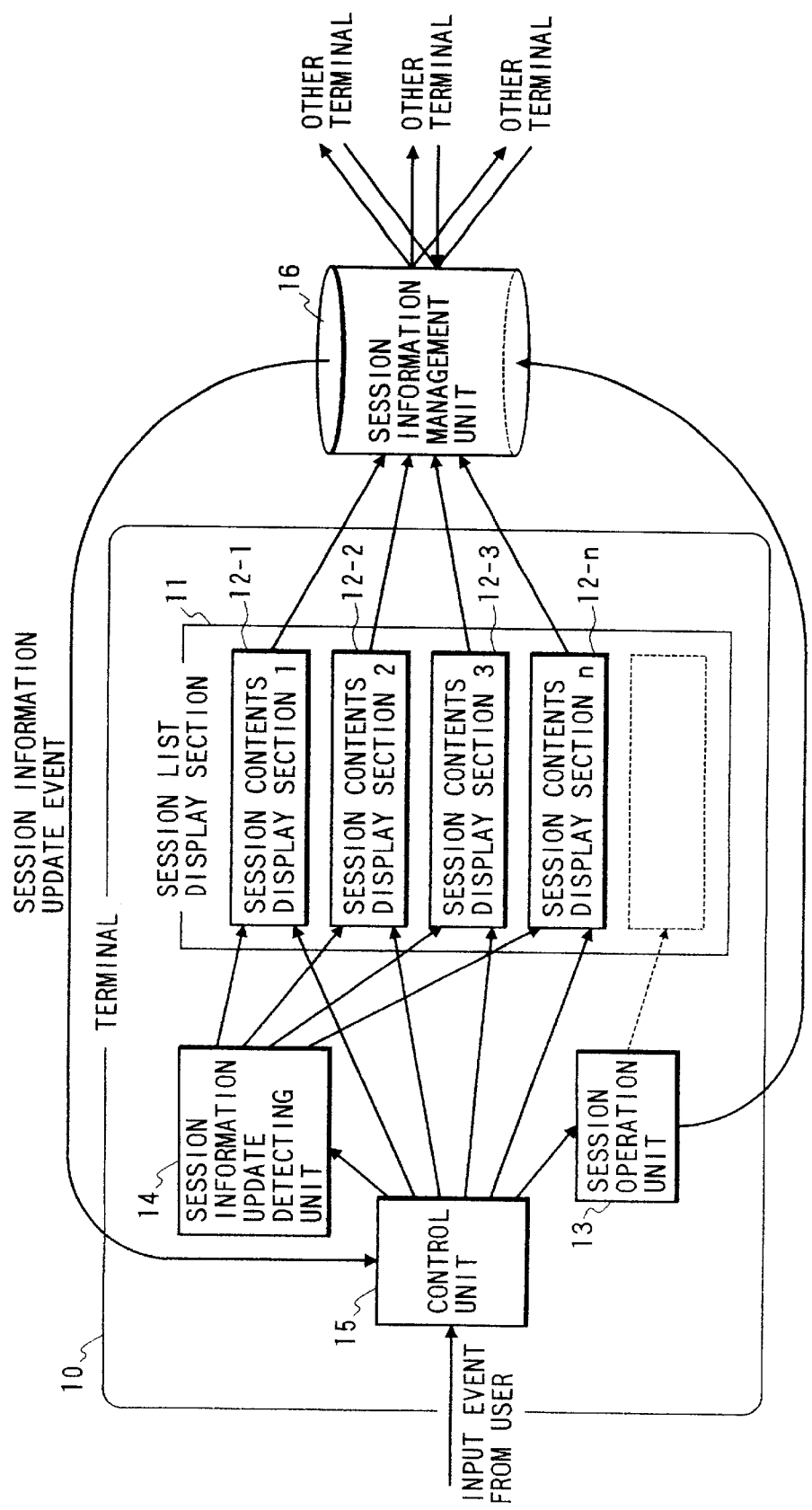

In FIG. 1B, reference numeral 10 denotes a terminal; and 11 denotes a session list display section, in the display portion 2 shown in FIG. 1A, that displays a list of session contents display sections 12-1 through 12-n. The session contents display sections 12-1 through 12-n in the display portion 2 in FIG. 1A are employed to display for a user data that are managed by a session information management unit 16. A session operation unit 13 instructs the generation of a session and its termination.

When information is updated by the session information management unit 16, a session information update event detecting unit 14 relays the updated contents to the session contents display sections.

A control unit 15 calls the appropriate procedures, which will be described later, in response to events that are initiated by user entries at the keyboard 5 or with the mouse 4 in FIG. 1A.

The session information management unit 16 collectively manages information concerning a session. The functions of the session information management unit 16 can be provided by using a special terminal, or by the session information unit 16 being employed at a terminal that provides control for a session.

The operations of the individual components in FIG. 1B will now be described.

The control unit 15 detects and responds to an event that is input using either the pointing device 4 or 5, or a session information update event from the session information management unit 16, and performs processing in consonance with the detected event. More specifically, when the control unit 15 detects a user initiated request for a scroll instruction event in the display region of the session list display section 11, the control unit 15 transmits the event request to the session list display section 11. Upon receipt of the event request, the session list display section 11 horizontally or vertically displaces data in the regions wherein the session contents display sections 12 are displayed. Even when the size of the display region of the session list display section 11 is limited, this operation can be performed to display all the session contents display sections 12.

When the control unit 15 detects a user initiated request for a display content update event in the display region of the session contents display section 12, the control unit 15 transmits the event request to the session contents display section 12. Upon receipt of the event request, the session contents display section 12 updates its display contents and updates the information held by the session information management unit 16.

When the control unit 15 detects a user initiated request for a session generation or termination of the generation in the display region of the session operation unit 13, the control unit 15 transmits the event request to the session operation unit 13. Upon receipt of the event request, the session operation unit 13 either generates the session contents display section 12 or terminates its generation, and updates the information held by the session information management unit 16.

When the control unit 15 detects an event request for a session information update originating at the session information management unit 16, i.e., an event request initiated by a user at another terminal, the control unit 15 transmits the event request to the session data update detecting unit 14. Upon receipt of the event, the session information update detecting unit 14 either generates the session contents display section 12 or terminates its generation, or updates the display contents in consonance with the detected event request.

The session information management unit 16 manages the information concerning a session. The session information management unit 16 receives requests from either the session contents display section 12 or the session operation unit 13, and updates the managed information. The session information management unit 16 then transmits to the control unit 15 of another terminal the updated contents.

Figure 2:
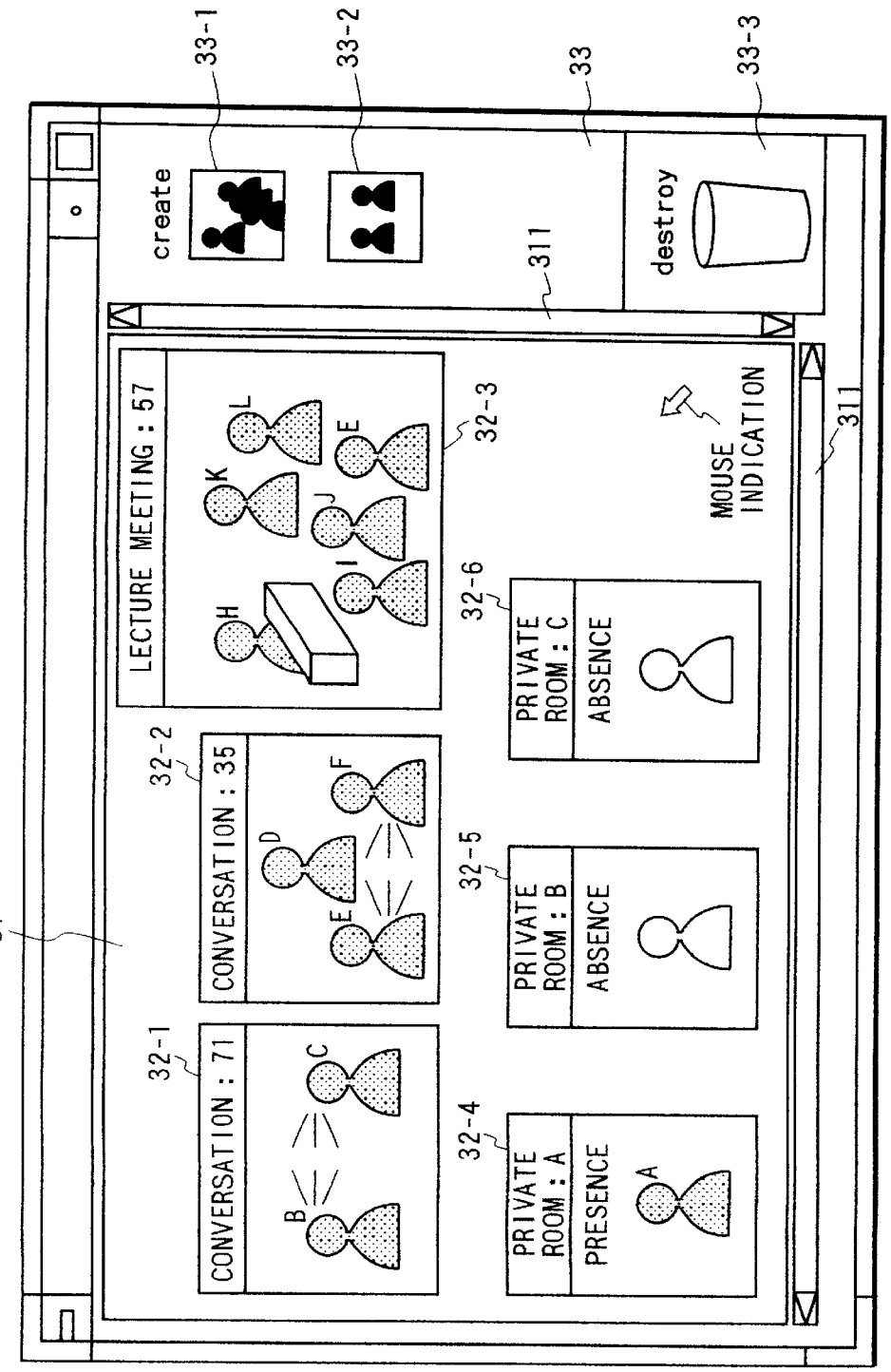
FIG. 2 is a diagram illustrating a user interface according to the first embodiment of the present invention.

A user interface is shown in FIG. 2.

In FIG. 2, a session list display panel 31 is the user interface for the session list display section 11, and includes session contents display panels 32-1 through 32-6. Upon receipt of input at a scroll bar 311, the display region is moved horizontally.

The session contents display panels 32-1 through 32-6 are user interfaces for the session contents display section 12, and information concerning the session is displayed thereon in a form that is consonant with a session type.

In the session contents display panel 32-1 in FIG. 2, a situation is depicted wherein B and C are participating in a conversation session. The indicated identification number for this session is 71.

In the session contents display panel 32-2, a situation is depicted wherein D3, E and F are participating in a conversation session. The indicated identification number for this session is 35.

In the session contents display panel 32-3, a situation is depicted wherein H is presenting a lecture and I, J, K, L and M are attending the lecture. The indicated identification number for this session is 57.

In the session contents display panel 32-4 is depicted a situation wherein A is present in his or her private room. In this situation, A can participate in (start) a session at any time.

In the session contents display panel 32-5 is depicted a situation wherein B is not present in his or her private room. B is participating in a session.

In the session contents display panel 32-6 is depicted a situation wherein C is not present in his or her private room.

The acts of participating in a session and exiting from a session are effected by dragging and dropping an icon for a person.

When, for example, A, who is an operator of this apparatus, desires to participate in the conversation between B and C, the icon for A in the panel 32-4 is dragged, by using the previously mentioned pointing device, and is dropped into the panel 32-1. Then, the icon of A in the panel 32-4 is altered to indicate absence, the icon A is added to the display region in the panel 32-1, and the situation is depicted wherein A, B and C are participating in a conversation. With this instruction, the main body 3 in FIG. 1A makes a communication line connections in consonance with telephone numbers, or addresses, for B and C that are stored in advance in a RAM (not shown). As a result, audio/video communication is attained.

A session operation panel 33 is a user interface for the session operation unit 13, and is employed to instruct the generation of a session and its termination.

A lecture assembly session is generated by depressing (clicking) a button 33-1 using the pointing device, and a conversation session is generated by depressing a button 33-2.

When a session is to be ended, the session is dragged using the previously mentioned pointing device, and is dropped on an ion 33-3.

Such a user interface can be built by a combination of, for example, the UNIX X-Window system and an OSF motif widget set.

The session list display panel 31 is constructed using a scroll window widget.

The session contents display panels 32-1 through 32-6 are constructed by using in a window a combination composed of a plurality of widgets.

The conversation session contents display panel, in which information concerning a conversation session is displayed, can be constructed by using in a combination composed of a label widget for displaying a session identifier in a window, a label widget for displaying the icon of a participant, and a RowColumn widget for arranging these label widgets.

The lecture assembly session contents display panel in which information concerning a lecture assembly session is displayed can be constructed using a combination composed of a label widget for displaying a session identifier in a window, a label widget for displaying the icon of a lecturer, and a RowColumn widget for arranging these label widgets.

The private room session contents display panels in each of which is displayed information concerning a private room session can be constructed by using a combination composed of a label widget for displaying the name of an owner of a session in a window, a label widget for displaying the icon of the owner, and a label widget for displaying the status of the owner.

The session operation panel 33 can be constructed by using a combination composed of a button widget for generating a conversation session, a button widget for generating a lecture assembly session, and a label widget for dropping an icon when a session is terminated.

The processing for the first embodiment will now be described while referring to FIGS. 2 through 13.

Since the session list display panel 31, which is the user interface for the session list display section 11, is provided by using a scroll window widget, the display region for the session list display section 11 is automatically scrolled in response to input at the scroll bar 311.

The number of sessions that are registered in the session information management unit 16 varies depending on the generation and the extinguishing of sessions.

Since the session contents display sections 12-1 through 12-n are provided in order to display for a user information that is managed by the session information management unit 16, the amount of information varies in consonance with the number of sessions that are registered by the session information management unit 16.

Therefore, the session contents display sections 12-1 through 12-n are provided by objects that are generated or extinguished in consonance with the generation and the extinguishing of sessions.

The session contents display sections 12-1 through 12-n are provided as objects, which are instances of a C++ class and are hereinafter called session objects.

Since the display condition varies depending on the session type and the information to be managed, and since the procedures that are used also differ, different session objects are introduced in consonance with the session types. For a display, the session contents display section for displaying information concerning a private room session introduces a private room session object; the session contents display section for displaying information concerning a conversation session introduces a conversation session object; and the session contents display section for displaying information concerning a lecture assembly session introduces a lecture assembly session object.

Figure 3:
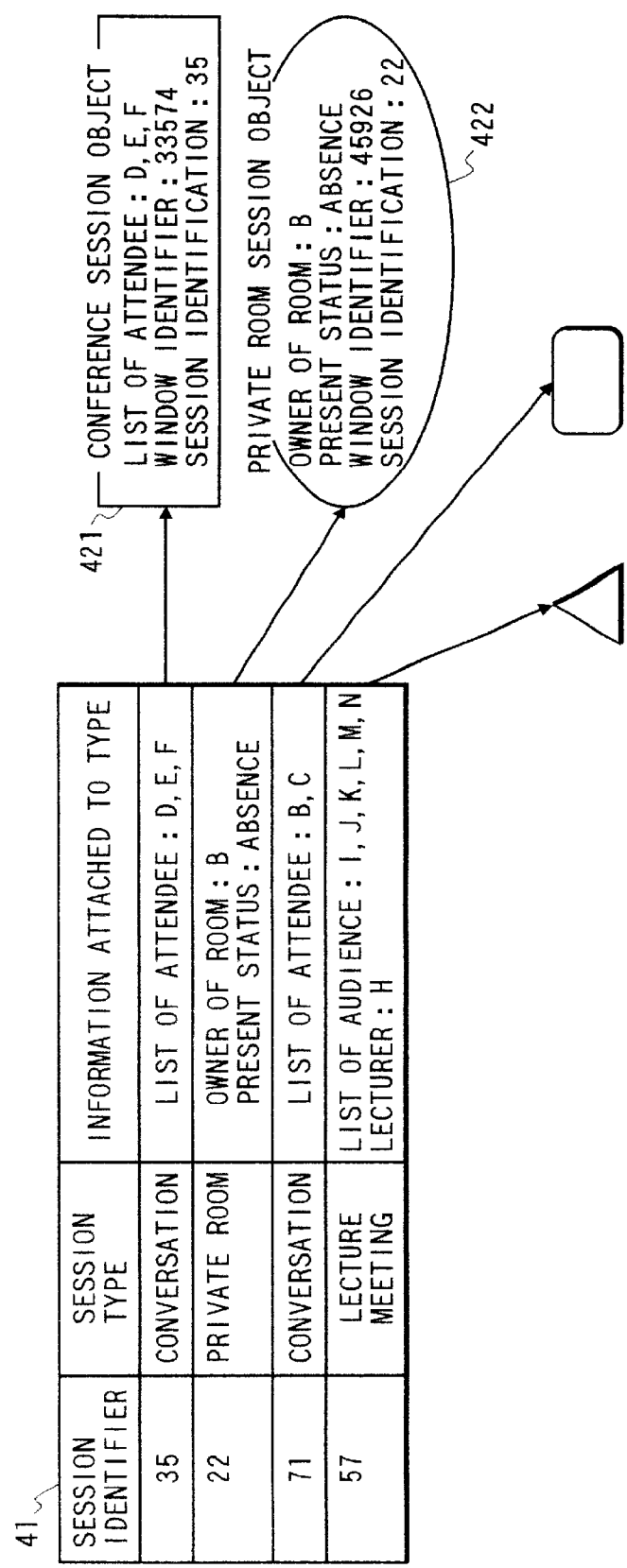
FIG. 3 is a diagram showing the relationship between data in a session data management unit and a session content display section.

FIG. 3 is a diagram showing the relationship between information that is managed by the session information management unit 16 and information that is managed by a session object, and that is stored in a RAM (not shown) in the terminal.

In FIG. 3, information that is managed by the session information management 16 is shown in the form of a table 41. Reference numerals 421 and 422 each denote information that is managed by a session object in a terminal 10.

The session information management unit 16 manages session identifiers, session types, and information that accompanies the session types.

The session object is established for each session, and manages information that is managed by the session information management unit 16 and information that is valid only in the terminal 10, such as window identifiers.

Since information concerning a session must be used in common by all the terminals that display a session list, the terminals hold in their memories session objects that correspond to all of the sessions that are registered in the session information management units 16.

Figure 4:
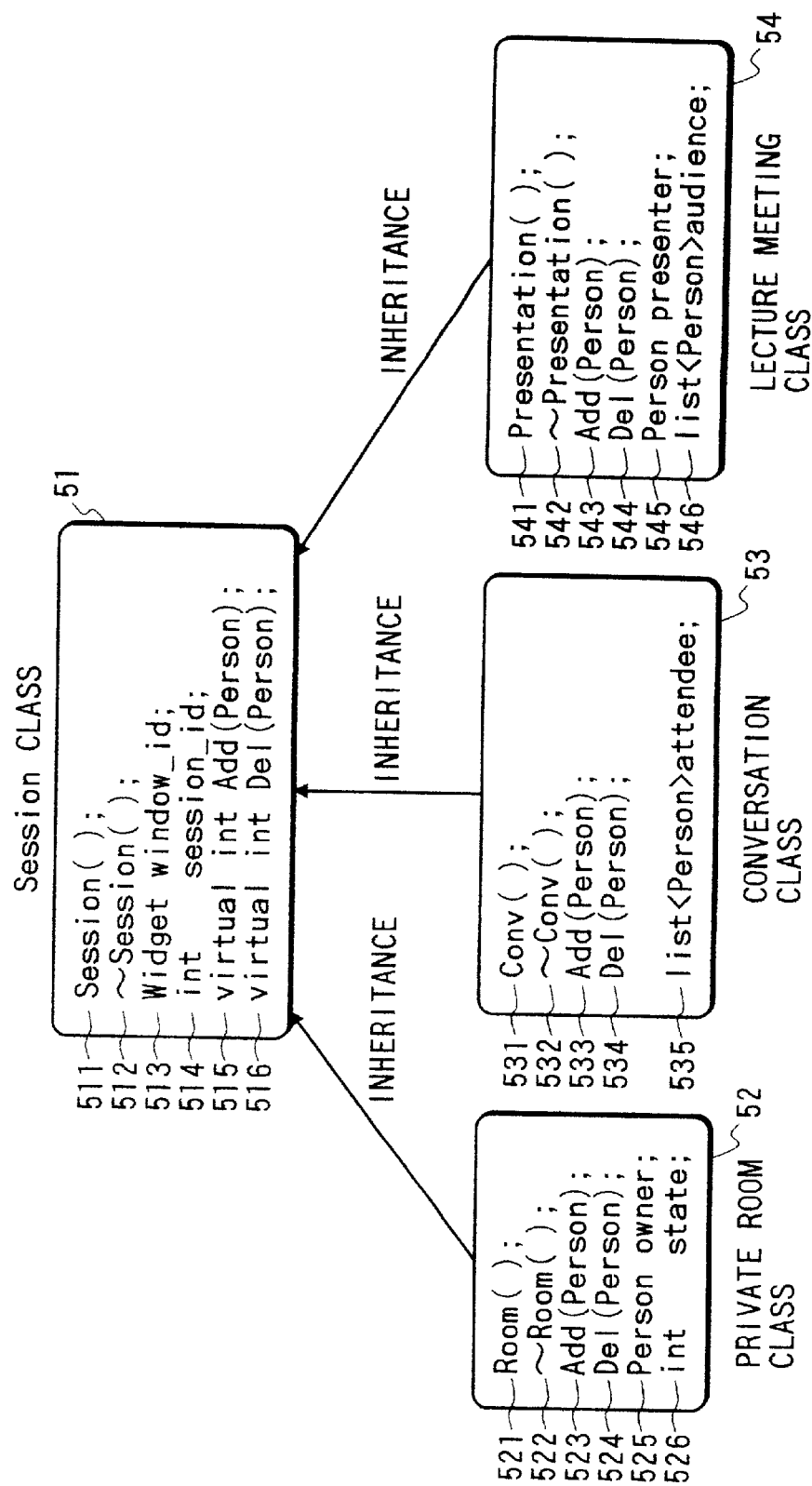
FIG. 4 is a diagram in which session objects are shown as classes according to the first embodiment of the present invention.

FIG. 4 is a diagram for explaining the classes that constitute each session object.

A private session object is an instance of a private room class 52, a conversation session object is an instance of a conversation class 53, and a lecture assembly session object is an instance of a lecture assembly class 54.

The private room class 52, the conversation class 53, and the lecture class 54 inherit the properties of a session class 51 that possesses attributes that are required for all the classes.

The session class 51 has as its members a window identifier 513 and a session identifier 514.

Further, as methods for session objects, the session class 51 includes an object generator 511, an object extinguisher 512, a procedure 515 for adding a person's icon to a display section, and a procedure 516 for deleting a person's icon from a display section.

Since the procedure 515 for adding a person's icon to a display section and the procedure 516 for deleting a person's icon from a display section differ, depending on the object, the procedures 515 and 516 at the session class 51 are declared as virtual functions.

The private room session class 52 inherits the session class 51 and includes a private room owner 525 and an owner's status 526 as its members.

Further, as methods for a private room session object, the private room session class 52 includes an object generator 521, an object extinguisher 522, a procedure 523 for adding a person's icon to a display section, and a procedure 524 for deleting a person's icon from a display section.

The conversation session class 53 inherits the session class 51 and has as its member a participant list 535.

Further, as methods for a conversation session object, the conversation session class 53 includes an object generator 531, an object extinguisher 532, a procedure 533 for adding a person's icon to a display section, and a procedure 534 for deleting a person's icon from a display section.

The lecture session class 54 inherits the session class 51 and has as its members a lecture 545 and an audience list 546.

Further, as methods for a lecture assembly session object, the lecture session class 54 includes an object generator 541, an object extinguisher 542, a procedure 543 for adding a person's icon to a display section, and a procedure 544 for deleting a person 's icon from a display section.

Various classes, such as a condition understanding class and a joint design class, can be easily created by inheriting the properties of the session class 51, and various sessions can be easily represented.

The operation for session objects will now be described while referring to FIGS. 5 through 8.

The generation of session objects can be performed by the functions of the classes shown in FIG. 4. The individual operations, i.e. the individual functions, will now be described.

First, the processing for generating a conversation session object will be explained. When a user has instructed the generation of a conversation object, the object generator 531 of the conversation class 53, which is the above described method stored in the RAM, is called. The generation instruction is transmitted as an argument to a session object, and a conversation session object is generated. The generation instructions in this case are a user's instruction designating a session identifier for performing a conversation session and a list of participants.

Figure 5:
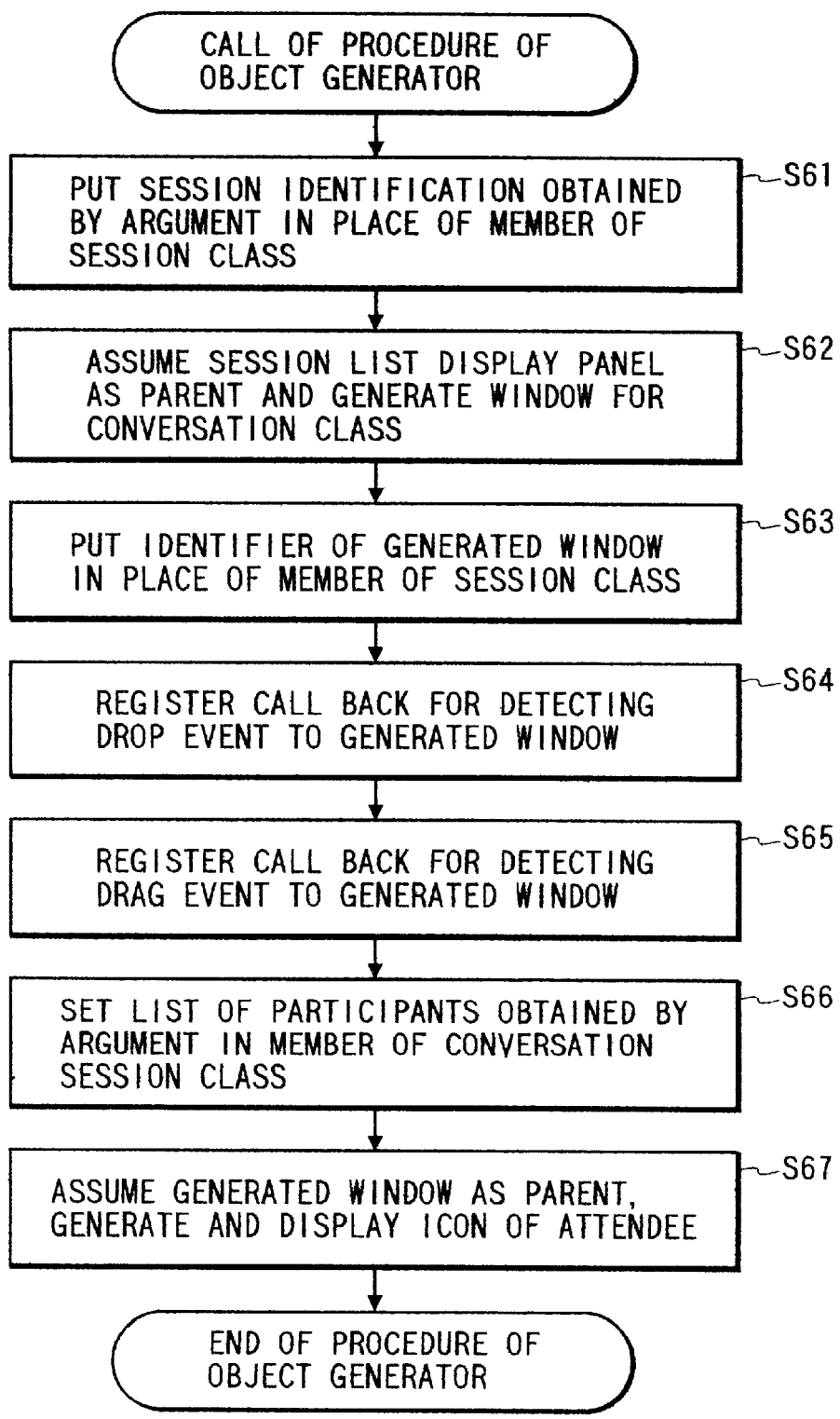
FIG. 5 is a flowchart of the processing for an object generator for a conversation session object.

FIG. 5 is a flowchart of the processing for the object generator 531 of the conversation session class 53. The session identifier and the participant list are transmitted as arguments to the object generator 531.

In FIG. 5, first, at step S61 a session identifier that is obtained by the argument is substituted into the member 513 of the session class 51.

The session generator (method) is processed by a CPU (not shown) in the main body 3. At step S62, the scroll window widget of the session list display panel 31 is employed as a parent window to generate a session contents display window for a conversation session. This session contents display window is a session contents display panel in which is displayed information concerning a conversation session, which was explained previously while referring to FIG. 2.

At step S63, the identifier for the window that is generated at step S62 is substituted into the member 513 of the session class 51.

At step S64, a call back function for detecting a drop event for the window that is generated at step S62 is registered by the control unit 15.

At step S65, a call back function for detecting a drag event for the window that is generated at step S62 is registered by the control unit 15.

At step S66, the participant list that is obtained by the argument is substituted into the member 535 of the conversation session class 53.

Finally, at step S67, the window that is generated at step S62 is employed as a parent window for the generation of an icon for a participant, which is then displayed.

In the following operations, the methods that have been called by a user using the pointing device are processed by a CPU (not shown) in the main body 3, as is described above. Then, the generation of the window and the termination of the window, and the addition and the deletion of a person's icon are performed.

The processing for the deletion of a conversation session object will now be described.

The object extinguisher 532 of the conversation session class 53 is called from the previously mentioned RAM in accordance with a D & D instruction of a user to end a conversation session, and a conversation session object is extinguished.

Figure 6:
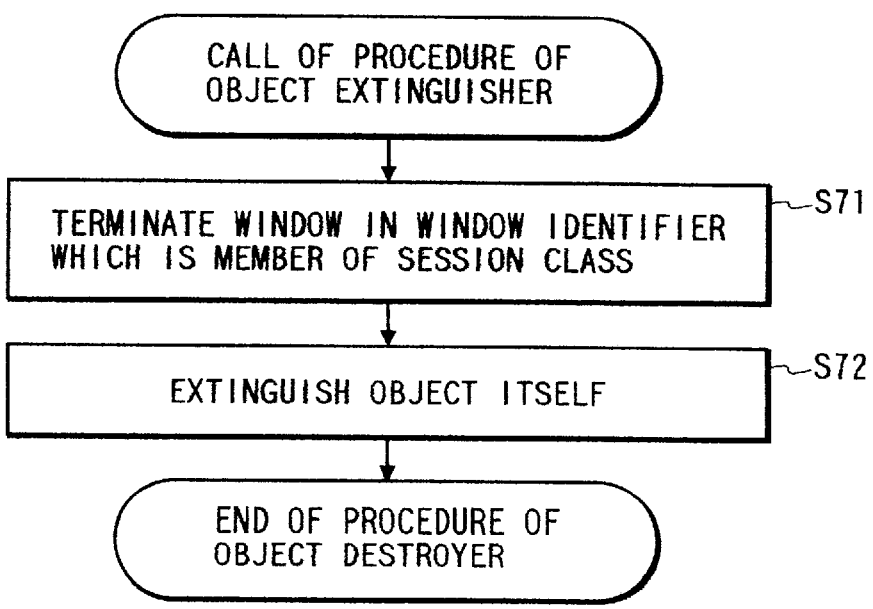
FIG. 6 is a flowchart of the processing for an object extinguisher for a conversation session object.

FIG. 6 is a flowchart of the processing for the object extinguisher 532 of the conversation session class 53.

In FIG. 6, first, at step S71, the window indicated by the member 513 of the session class 51 is terminated. In other words, the conversation session window that is generated at step S62 is terminated.

At step S72, a storage area that the object uses is opened and the object itself is extinguished.

The processing performed when the procedure 533 for adding a person's icon to a display section will now be described.

Figure 7:
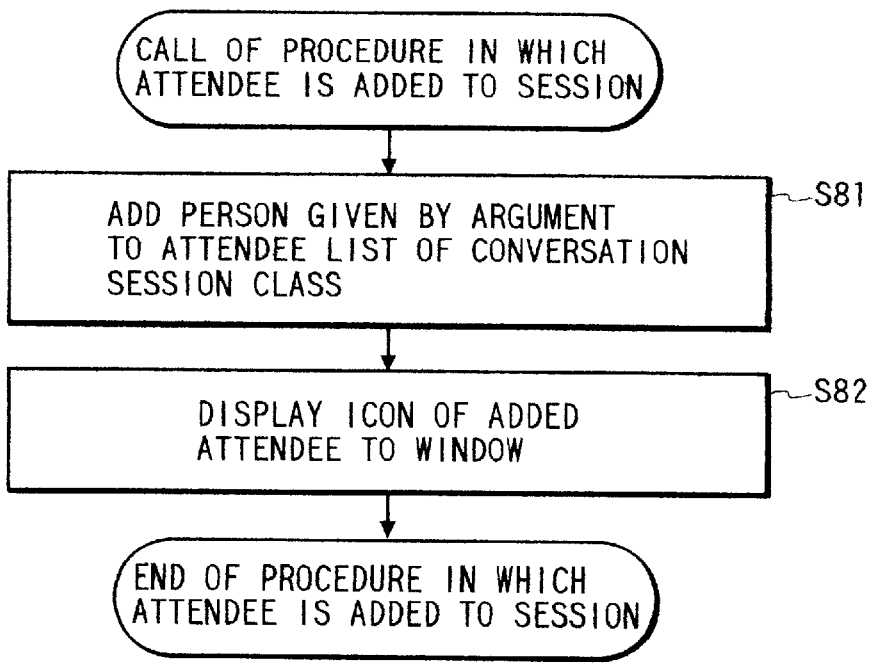
FIG. 7 is a flowchart of the processing for adding the icon for a participant to a conversation session object.

FIG. 7 is a flowchart of the procedure 533 for adding a person 's icon to the session content display panel for the conversation session object.

In FIG. 7, first, at step S81, a participant who is obtained by an argument, which represents a participant designated in accordance with a user's D & D instruction, is added to the conversation session object participant list 535.

At step S82, the icon for the added participant is generated by employing, as a parent window, the window indicated by the window identifier that is substituted into the session object member 513.

The processing performed when the procedure 534 for deleting a person's icon from a display section is called will now be explained.

Figure 8:
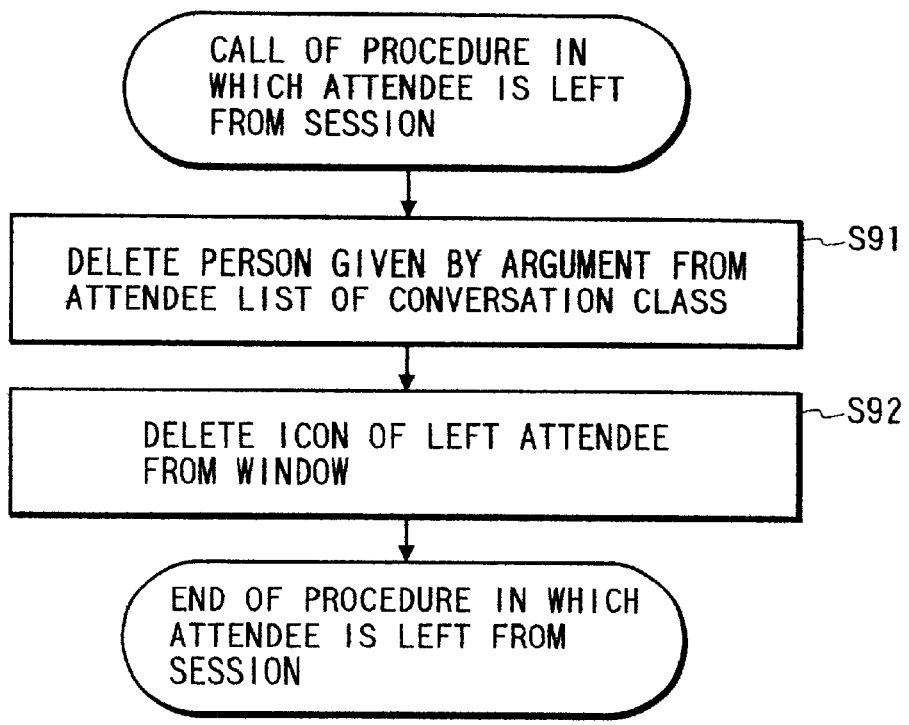
FIG. 8 is a flowchart of the processing for deleting an icon for a participant from a conversation session object.

FIG. 8 is a flowchart of the procedure 534 for deleting a person's icon from the session contents display panel for the conversation session object.

In FIG. 8, first, at step S91, the participant who is obtained by the argument that is indicated in accordance with a user's D & D instruction, in the same manner as is described above, is deleted from the conversation session object participant list 535.

At step S92, the icon for the deleted participant is deleted.

The processing of the call back functions that are registered at steps S64 and S65 in FIG. 5 will now be explained while referring to FIGS. 9 and 10.

Figure 9:
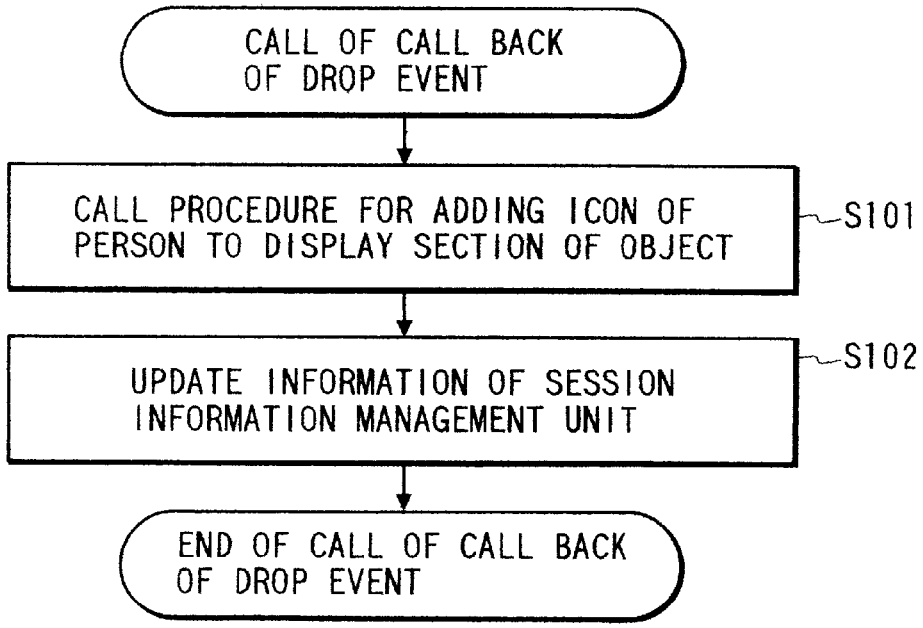
FIG. 9 is a flowchart of the processing for a function for calling back a drop event for a conversation session object.

FIG. 9 is a flowchart of the procedures for the call back function that is registered at step S64.

In FIG. 9, first, at step S101, the procedure 533 for adding a person's icon to the session contents display panel for the conversation session object is called. In other words, the procedures at step S80 and the following steps are performed. At step S102, the information held by the session information management unit 16 is updated.

FIG. 10 is a flowchart of the procedures for the call back function that is registered at step S65.

In FIG. 10, first, at step S111, the procedure 534 is called to delete a person's icon from the session contents display panel for the conversation session object. In other words, the procedures at step S90 and the following steps are performed. At step S112, the information held by the session information management unit 16 is updated.

The processing for generating a lecture assembly session object will now be described.

When a user has instructed the generation of a lecture assembly session object, the object generator 541 of the lecture session class 54 is called. The generation instruction is provided as an argument to the object generator 541, so that the lecture assembly session object is generated.

A session identifier, a lecturer, and an audience list are provided as arguments for the object generator 541.

In the processing for the generation of the lecture assembly session object, the window that is generated at step S62 in the processing for the generation of the conversation session object is replaced with a window for a lecture assembly session. Further, step S66, wherein the participant list is set to the member 535, is replaced with a process whereby the audience list is substituted into the member 546 and the lecturer is substituted into the member 545, and step S67, whereat the participant's icon is generated and displayed, is replaced with a process whereby the icon for the lecturer is generated and displayed in a lecturer display region and the icon for an audience is generated and displayed in an audience display region.

The processing for the deletion of the lecture assembly session object will now be described.

The lecture assembly session object is extinguished by calling the object extinguisher 542 of the lecture session class 54 in accordance with a user 's instruction to terminate a lecture assembly session.

In the processing for extinguishing the lecture assembly session object, the window that is terminated at step S71 in the processing for extinguishing the conversation session object is replaced with a window for a lecture.

The processing performed when the procedure 543 is called for adding a person's icon to the lecture assembly session object display section will now be explained In the procedure 543 for adding a person's icon to the lecture assembly session object, the audience list is set instead of setting the participant list at step S81 of the procedure 533 for adding a person's icon to the conversation session object, and the icon for the audience is displayed in the display region instead of displaying the icon for the participant at step S82.

The processing performed when the procedure 544 is called for deleting a person's icon from the lecture assembly session object display section will now be explained.

In the procedure 544 for deleting a person's icon from the lecture assembly session object, a designated audience is deleted from the audience list 546, instead of deleting a participant from the participant list 535 at step S91 of the procedure 534 for deleting the person's icon from the conversation session object.

In the processing for setting the call back function when the lecture assembly session object is generated, the procedure 533 in the processing for setting the call back function for the conversation session object is replaced with the procedure 543, and the procedure 534 is replaced with the procedure 544.

The processing for generating a private room session object will now be described.

When a user has instructed the generation of a private room session object, the object generator 521 of the private room session class 52 is called. The generation instruction is provided as an argument to the object generator 521, so that the private room session object is generated.

A session identifier and a room owner are provided as arguments for the object generator 521.

In the processing for generating the private room session object, the window that is generated at step S62 in the processing for generating the conversation session object is replaced with a window for a private room session. Further, step S66 whereat the participant list is set to the member 535 is replaced with a process whereby the owner is substituted into the member 525, and step S67 whereat the participant's icon is generated and displayed is replaced with a process whereby the icon for the room owner is generated and is displayed in a owner display region.

The processing for deleting the private room session object will now be described.

The private room session object is extinguished by calling the object extinguisher 522 of the private room session class 52 in accordance with a user's instruction to terminate a private room session.

In the processing for extinguishing the private room session object, the window that is terminated at step S71 in the processing for extinguishing the conversation session object is replaced with a window for a private room.

The processing performed when the procedure 523 is called for adding a person's icon to the private room session object display section will now be explained.

In the procedure 523 for adding a person's icon to the private room session object, the status of the owner is set to present instead of setting the participant list at step S81 of the procedure 533 for adding the person's icon to the conversation session object, and the icon for the owner is displayed in the owner's display region instead of displaying the icon for the participant at step S82.

The processing performed when the procedure 524 is called for deleting a person's icon from the private room session object display section will now be explained.

In the procedure 524 for deleting a person's icon from the private room session object, the absence of the owner is set instead of deleting a participant from the participant list 535 at step S91 of the procedure 534 for deleting the person's icon from the conversation session object.

In the processing for setting the call back function when the private room session object is generated, the procedure 533 in the processing for setting the call back function for the conversation session object is replaced with the procedure 523, and the procedure 534 is replaced with the procedure 524.

Since only the owner of the private room is allowed to enter the private room, the call back procedure is performed only when the icon that is dropped in the display region for the private room session object belongs to that owner.

The call back routine of the session operation unit 13 will now be explained while referring to FIGS. 11 through 13.

FIG. 11 is a flowchart of a call back routine that is begun when the lecture assembly session generation request button 33-1 is depressed by a user using the pointing device.

In FIG. 11, first, at step S121, the lecture assembly session object is generated. This process corresponds to the calling of the object generator 541 from the lecture class 54. At step S122, the information in the session information management unit 16 is updated.

Figure 12:
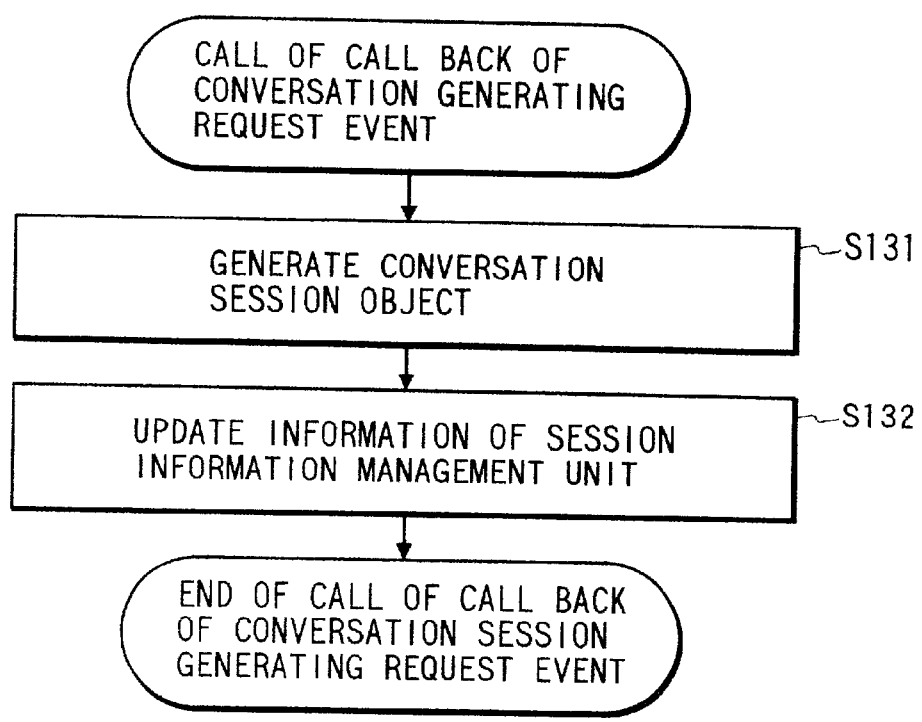
FIG. 12 is a flowchart of the processing for a function for calling back a lecture assembly session creating request event.

FIG. 12 is a flowchart of a call back routine that is begun when the conversation session generation request button 33-2 is depressed by a user using the pointing device.

In FIG. 12, first, at step S131, the conversation session object is generated. This process corresponds to the calling of the object generator 531 from the conversation class 54. At step S132, the information in the session information management unit 16 is updated.

Figure 13:
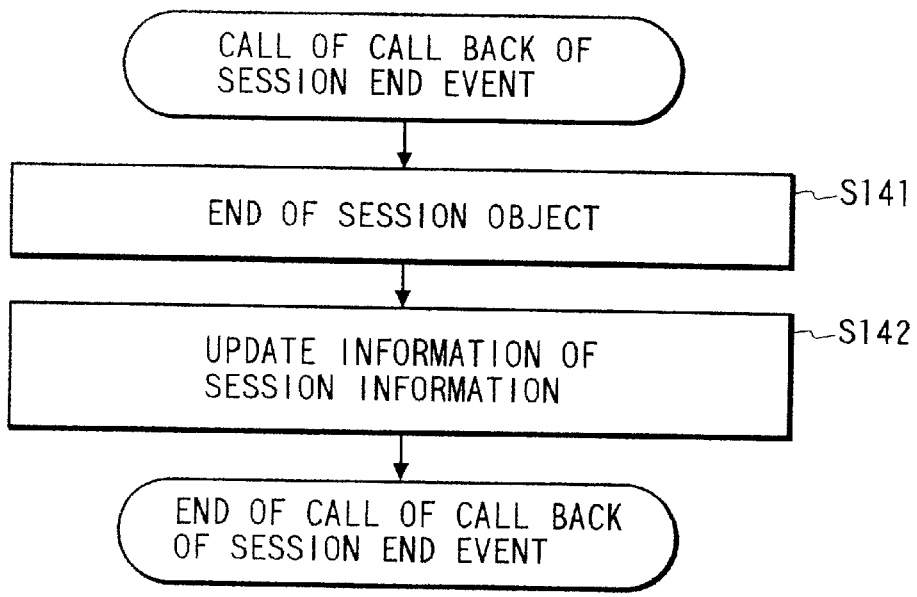
FIG. 13 is a flowchart of the processing for a function for calling back a session termination event.

FIG. 13 is a flowchart of the call back routine that is begun when the session contents display panel is dropped to the session end region 33-3 by a user using the pointing device.

In FIG. 13, first, at step S141, the session object is terminated.

This process corresponds to the calling of the object extinguisher for the class to be terminated. The object extinguisher 532 for the conversation class 53 is called to terminate the conversation session object. The object extinguisher 542 for the lecture class 54 is called to terminate the lecture assembly session object. Then, at step S142, the information held by the session information management unit 16 is updated.

The session information update detecting unit 14 is provided by the call back routine that is activated when the control unit 15 has detected the session information update event from the session information management unit 16.

The operation of the session information update detecting unit 14 is as follows.

In the call back routine for an event that the session has been generated, the session information update detecting unit 14 receives the session identifier, the session type and its attribute as arguments, and generates a session object that corresponds to the session type.

In the call back routine for an event that the session has been terminated, the session information update detecting unit 14 receives the session identifier as an argument, and terminates the session object that is indicated by the session identifier.

In the call back routine for an event when a participant is added to a session, the session information update detecting unit 14 receives the session identifier and the added participant as arguments, and adds the participant to the session object that is indicated by the session identifier. This process corresponds to the calling of the procedure for adding a person's icon to the display section of the session object that is designated by the argument.

In the call back routine for an event where a participant has exited a session, the session information update detecting unit 14 receives, as arguments, the session identifier and the identification for the participant who has exited, and deletes the participant from the session object that is indicated by the session identifier. This process corresponds to the calling of the procedure for deleting a person's icon from the display section of the session object that is designated by the argument.

The control unit 15 calls the appropriate procedure in response to the event that has occurred, and is set in an event wait loop of the X-Window. The operation of the control unit 15 is as follows.

When an event that a user has initiated by clicking the pointing device has been detected as an event for the scroll bar 311 of the session list display panel 31, the control unit 15 scrolls the display region of the session list display section 31.

When an event that a user has initiated by clicking the pointing device has been detected as an event for the session contents display panel 32, the control unit 15 performs the call back routine of the session contents display section 12.

When an event that a user has initiated by clicking the pointing device has been detected as an event for the session operation panel 33, the control unit 15 performs the call back routine of the session operation unit 13.

When a message from the session information management unit 16 has been detected, the control unit 15 performs the call back routine of the session information detecting unit 14.

A second embodiment will now be described.

In the second embodiment, management of session access and of session privacy in the first embodiment introduced.

Figure 14:
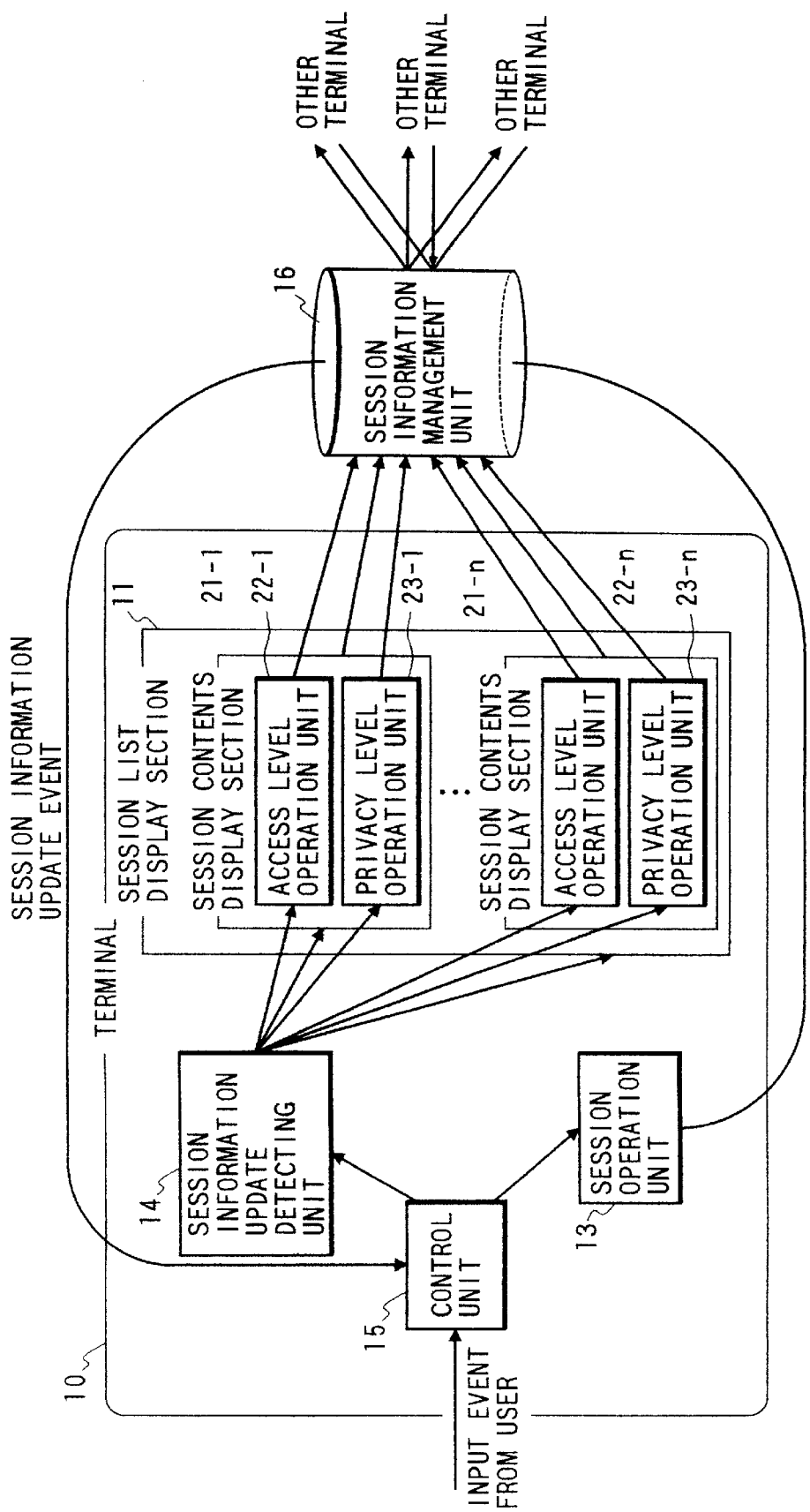
FIG. 14 is a block diagram illustrating the structure of a session operation apparatus according to a second embodiment of the present invention.

FIG. 14 is a functional block diagram illustrating the components of a session operation apparatus according to the second embodiment.

In FIG. 14, access level operation units 21-1 through 21-n, which introduce session contents display sections in the first embodiment, display a permission level for participation in a session and set the permission level to participate in a session.

Privacy level operation units 23-1 through 23-n display a permission level for accessing the status of the situation for a session and sets a permission level for accessing the status of the situation for a session.

The operations of the individual components in FIG. 14 will now be explained.

The access level operation units 22-1 through 22-n and the privacy level operation units 23-1 through 23-n are generated when the session contents display sections 21 are generated, and are extinguished when the session contents display sections 21 are extinguished.

When a control unit 15 has detected input to the access level operation units 22-1 to 22-n, the displays of the access level operation units 22 are updated, and the information held by a session information management unit 16 is updated. When the control unit 15 has detected input to the privacy level operation unit 23-1 to 23-n, the displays of the privacy level operation units 23 are updated, and the information held by a session information management unit 16 is updated.

Figure 15:
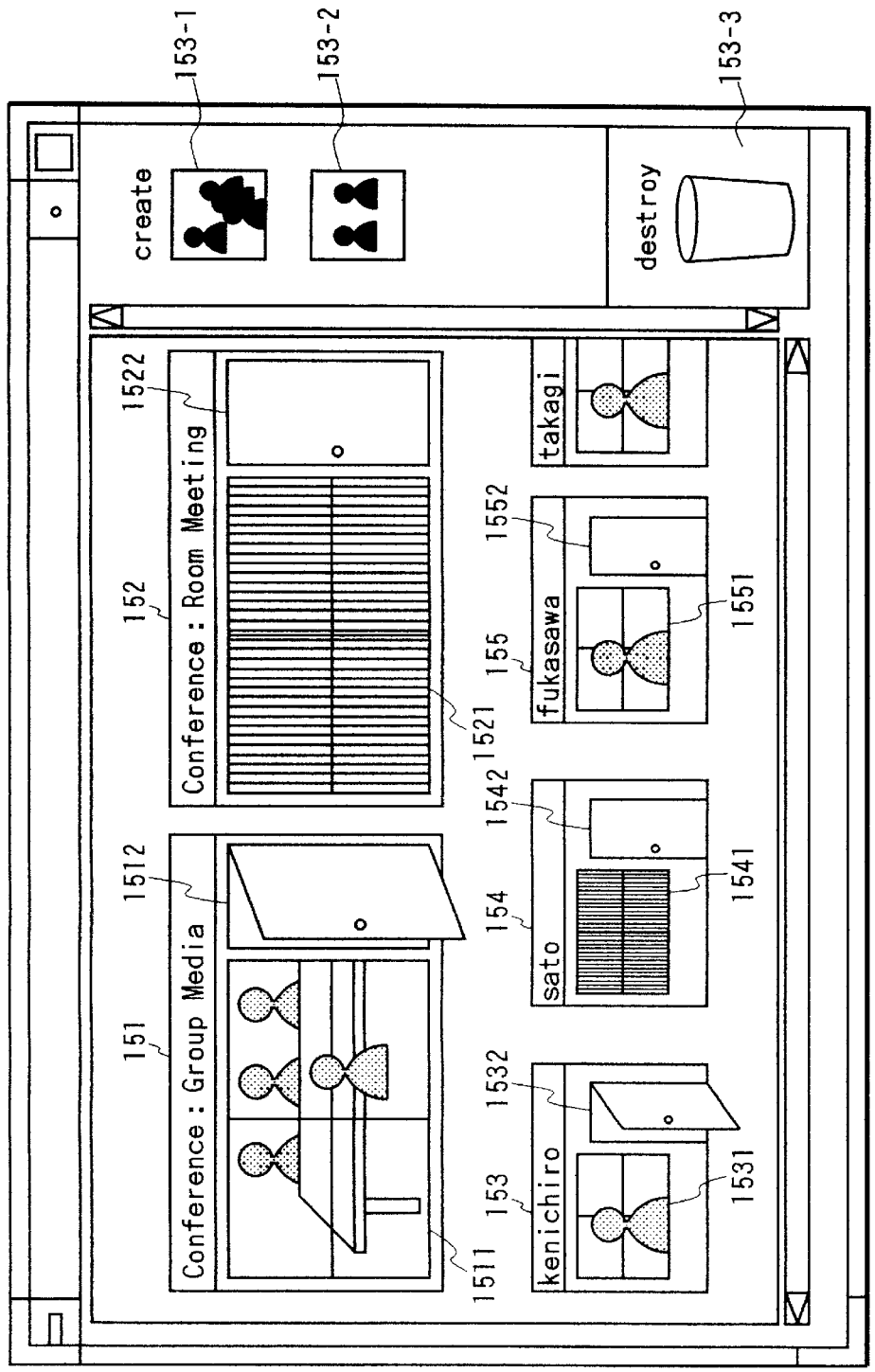
FIG. 15 is a diagram illustrating a user interface according to the second embodiment.

User interfaces according to the second embodiment are shown in FIG. 15.

In FIG. 15, session contents display panels 151, 152, 153, 154 and 155 are user interfaces for the session contents display sections 21.

The session contents display panel has a window icon and a door icon. The door icon indicates a permission level for participating in a session, and the window icon indicates the access level for obtaining information concerning the statue of the situation in a session. The door icon is an interface for the access level operation unit 22, and the window icon is an interface for the privacy level operation unit 23.

In the second embodiment, when the window icon is in the open state it indicates that it is possible to obtain knowledge concerning the situation by using audio/video information, and when the window icon is in the closed state it indicates that it is impossible to obtain knowledge concerning the situation by using audio/video information.

When the door icon is in the open state it indicates that users can participate in a session as desired, and when the door icon is in the closed state it indicates that users can not participate in a session.

In FIG. 15, the session contents display panel 151 indicates a conversation session, a window icon 1511 indicates that knowledge of the situation in the session can be obtained by using audio/video information, and a door icon 1512 indicates that users can participate in a session as desired.

The session contents display panel 152 indicates a conversation session, a window icon 1521 indicates that knowledge concerning the situation in the session can not be obtained, and a door icon 1522 indicates that users can not participate in a session.

The session contents display panel 153 indicates a private room session, a window icon 1531 indicates that knowledge concerning the situation in the private room can be obtained by using audio/video information, and a door icon 1532 indicates that users can participate in a session as desired.

The session contents display panel 154 indicates a private room session, a window icon 1541 indicates that knowledge concerning the situation in the private room can not be obtained by using audio/video, and a door icon 1542 indicates that users can not freely participate in a session.

The session contents display panel 155 indicates a private room session, a window icon 1551 indicates that knowledge concerning the situation in the private room can be obtained by using audio/video, and a door icon 1552 indicates that users can not freely participate in a session.

When more door icons and window icons are provided, access management and privacy management at additional stages can be realized. For example, it is possible to obtain knowledge concerning a situation by using only video or only audio, and to participate in a session only in an emergency.

Figure 16A:
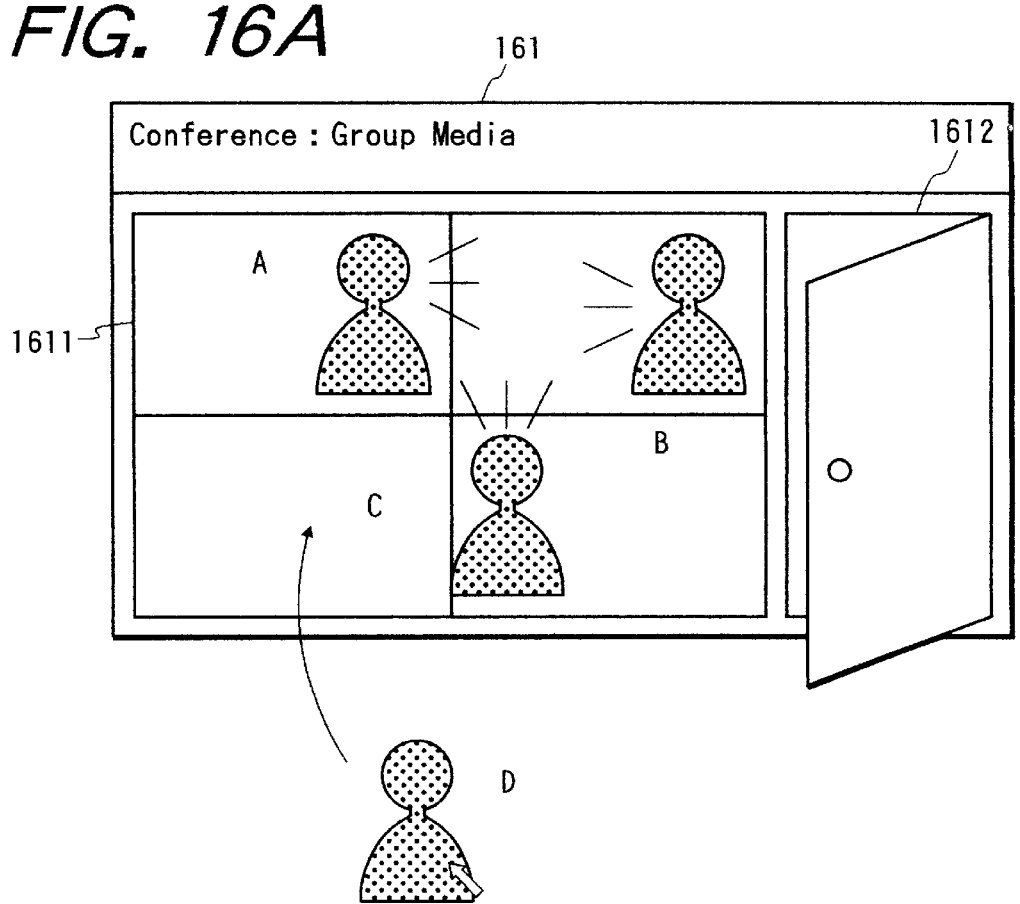
FIGS. 16A and 16B are diagrams illustrating a user interface, a camera control interface, and an input image display on a session content display panel according to the second embodiment.

In FIG. 16A is shown an example session contents display panel 161.

In the session contents display panel 161 shown in FIG. 16A, A, B and C are conversing, and a window icon 1611 and a door icon 1612 are open.

Figure 16B:
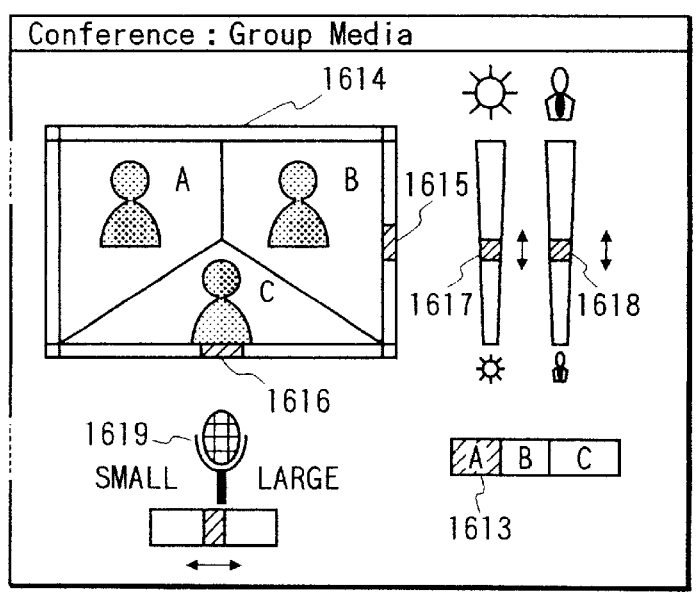
Figure 17:
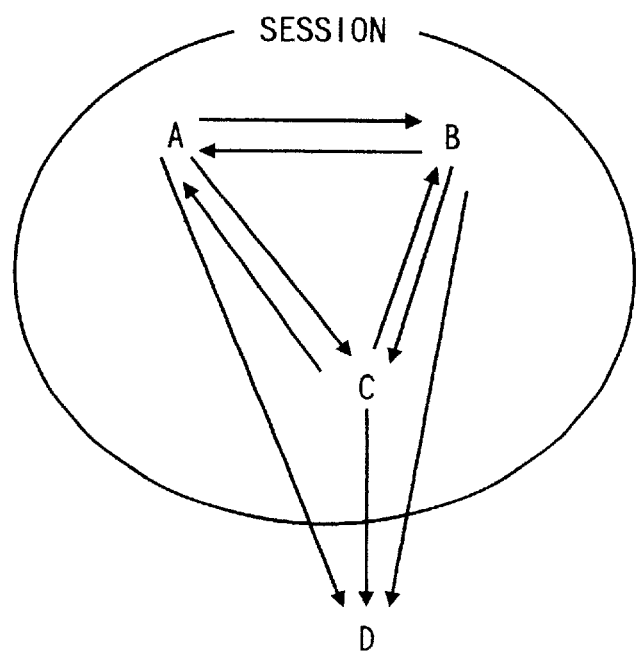
FIG. 17 is a diagram illustrating the line connections for understanding the operating conditions of a session.

When a user D drops his or her icon into the window icon 1611, by using the previously mentioned pointing device, the user D can directly obtain knowledge concerning the situation in the session. As a result, the display in FIG. 16B is displayed on the session contents display panel 161, with three real time images of A, B and C being displayed in a window icon 1614. Reference numerals 1615, 1616, 1617 and 1618 are camera control interfaces that enable the controls for panning and tilting, brightness, and zooming for a camera, which is connected to a terminal that is designated by an instruction icon 1613. An interface 1619 is employed to instruct an increase and a decrease in the volume for the session. The line connections shown in FIG. 17 are provided, and audio/video output from A, B and C can be acquired. The directions indicated by the arrows represent the directions in which audio/video data are transmitted.

Figure 18:
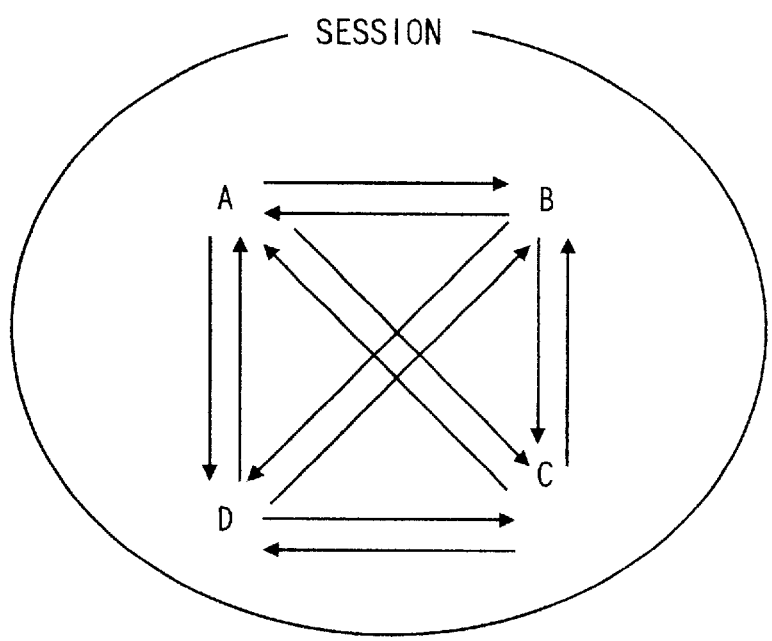
FIG. 18 is a diagram illustrating the line connections while participating in a session.

When the icon of the user D is dropped on the door icon, the user D can participate in the session. In other words, the line conditions shown in FIG. 18 is provided.

The processing will now be described while referring to FIGS. 19 through 24.

Just as in the case of the session contents display sections 12 in the first embodiment, the session contents display section 21 in this embodiment are realized as instances of classes that are consonant with session types, i.e., as objects.

Figure 19:
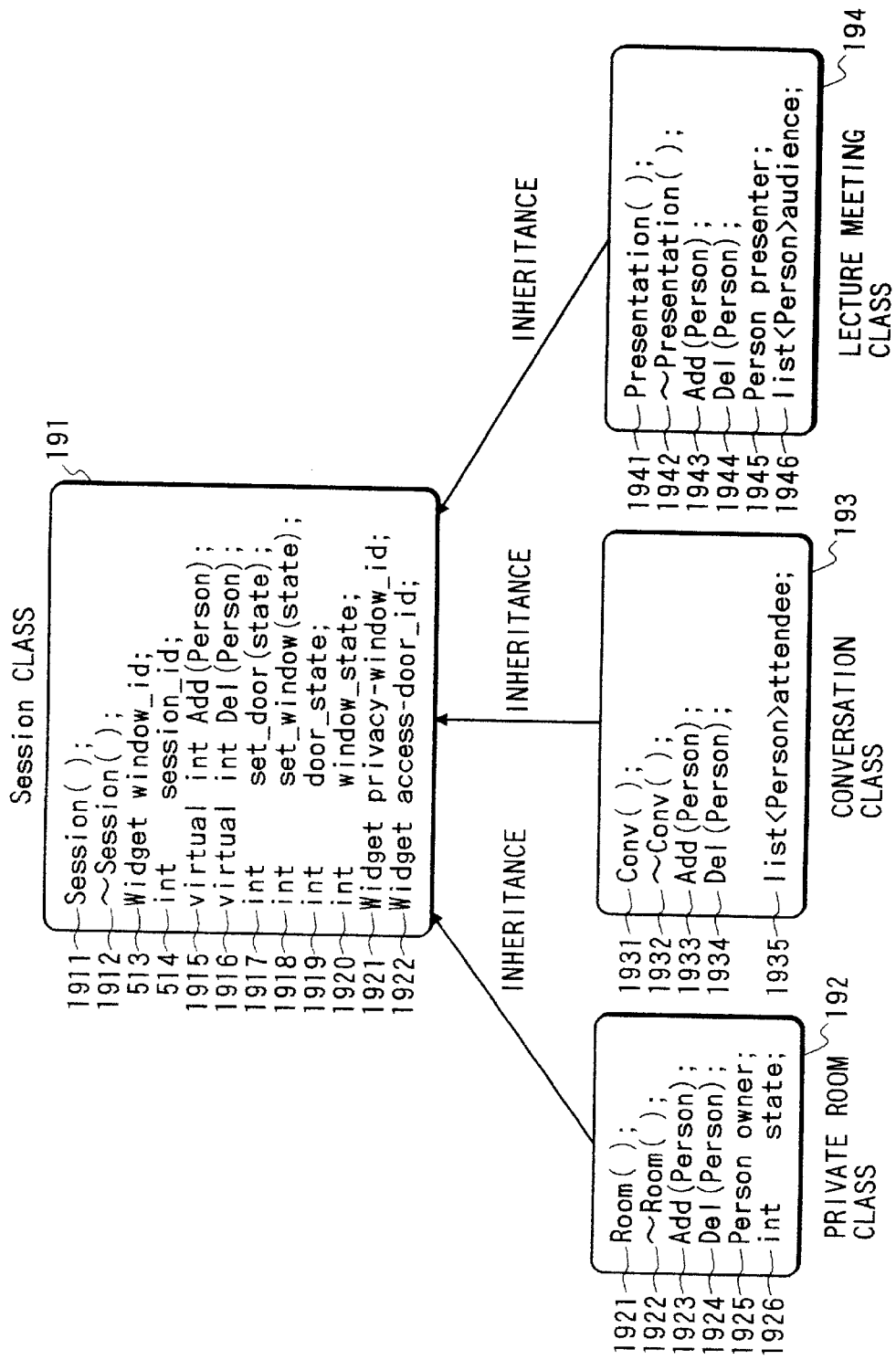
FIG. 19 is a diagram in which session objects are shown as classes according to the second embodiment of the present invention.

FIG. 19 is a diagram for explaining classes that constitute session objects in this embodiment.

In addition to the session objects for the first embodiment, the session objects in this embodiment further include a procedure 1917 for setting the state of a door, a procedure 1918 for setting the state of a window, a session door state 1919, a session window state 1920, a window identifier 1921 for a window icon, and a window identifier 1922 for a door icon.

The access level operation unit 22 and the privacy level operation unit 23 are realized by employing information that is managed by the session object and the procedure for the session object.

That is, the access level operation unit 22 is constituted by the procedure 1917 for setting the state of a door, the session door state 1919, and the window identifier 1922. The privacy level operation unit 23 is constituted by the procedure 1918 for setting the state of a door, the session window state 1920, and the window identifier 1921.

When a user employs the pointing device to instruct the generation of a conversation session, a generator 1931 for a conversation session object is called and a conversation session object is generated. While the conversation session window is generated at step S62 in the processing for the first embodiment for generating the conversation session object, according to the processing of the conversation session object generator 1931, a window icon for displaying the session privacy set state is generated and its window identifier is substituted into a member 1921; a window for displaying information about the conversation session is generated by using the window icon as a parent and its window identifier is substituted into a member 513; and a door icon for displaying the access set state is generated and its window identifier is substituted into a member 1922. Further, while the call back function is registered at steps S64 and S65 during the generation of the conversation session object, a call back function for detecting an event at a window icon and a call back function for detecting an event at a door icon are registered.

When a user employs the pointing device to instruct the termination of a conversation session, a conversation session object extinguisher 1932 is called and the conversation session object is extinguished. While the window indicated by the session class member 513 is terminated at step S71 in the processing for the first embodiment for extinguishing the conversation session object, additionally, in the processing for the conversation session object extinguisher 1932, the window that represents the privacy set state indicated by the member 1921 and the window that represents the access set state indicated by the member 1922 are terminated.

For the conversation session object, a procedure 1933 for adding a person's icon and a procedure 1934 for deleting a person's icon are the same as the procedures 533 and 534 in the first embodiment.

When a user employs the pointing device to instruct the generation of a lecture assembly session, a generator 1941 for a lecture assembly session object is called and a lecture assembly session object is generated. While the lecture assembly session window is generated in the processing for the first embodiment for generating the lecture assembly session object, according to the processing for the lecture assembly session object generator 1941, a window icon for displaying the session privacy set state is generated and its window identifier is substituted into a member 1921; a window for displaying information about the lecture assembly session is generated by using the window icon as a parent and its window identifier is substituted into a member 513; and a door icon for displaying the access set state is generated and its window identifier is substituted into a member 1922. Further, while the call back function is registered at steps S64 and S65 during the generation of the lecture assembly session object, a call back function for detecting an event at a window icon and a call back function for detecting an event at a door icon are registered.

When a user employs the pointing device to instruct the termination of a lecture assembly session, a lecture assembly session object extinguisher 1942 is called and the lecture assembly session object is extinguished. While the window indicated by the session class member 513 is terminated in the processing for the first embodiment for extinguishing the lecture assembly session object, additionally, in the processing for the lecture assembly session object extinguisher 1942, the window that represents the privacy set state indicated by the member 1921 and the window that represents the access set state indicated by the member 1922 are terminated.

For the lecture assembly session object, a procedure 1943 for adding a person's icon and a procedure 1944 for deleting a person's icon are the same as the procedures 543 and 544 in the first embodiment.

When a user employs the pointing device to instruct the generation of a private room session, a generator 1921 for a private room session object is called and a private room session object is generated. While the private room session window is generated in the processing for the first embodiment for generating the private room session object, according to the processing for the private room session object generator 1921, a window icon for displaying the session privacy set state is generated and its window identifier is substituted into a member 1921; a window for displaying information about the private room session is generated by using the window icon as a parent and its window identifier is substituted into a member 513; and a door icon for displaying the access set state is generated and its window identifier is substituted into a member 1922. Further, while the call back function is registered at steps S64 and S65 during the generation of the private room session object, a call back function for detecting an event at a window icon and a call back function for detecting an event at a door icon are registered.

When a user employs the pointing device to instruct the termination of a private room session, a private room session object extinguisher 1922 is called and the private room session object is extinguished. While the window indicated by the session class member 513 is terminated at step S71 in the processing for the first embodiment for extinguishing the private room session object, additionally, in the processing for the private room session object extinguisher 1922, the window that represents the privacy set state indicated by the member 1921 and the window that represents the access set state indicated by the member 1922 are terminated.

For the private room session object, a procedure 1923 for adding a person's icon and a procedure 1924 for deleting a person 's icon are the same as the procedures 523 and 524 in the first embodiment.

The call back function that is to be registered when the conversation session object is generated will now be explained.

Figure 20:
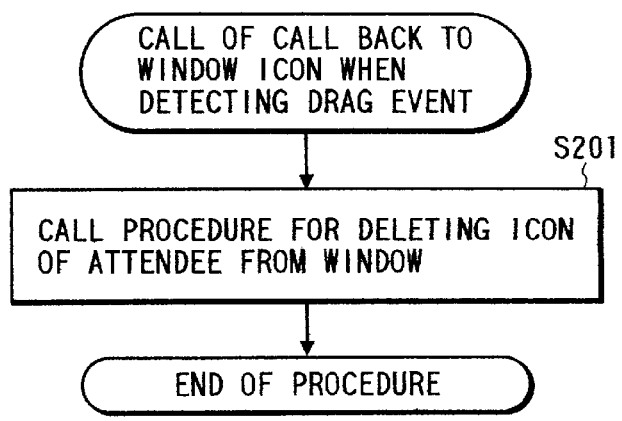
FIG. 20 is a flowchart of the processing for calling back a drag event for a window icon.

FIG. 20 is a call back routine that is activated when a drag event at the window icon of the conversation session object is detected.

In FIG. 20, at step S201, the procedure 1934 is called for deleting the icon for a participant from the window.

Figure 21:
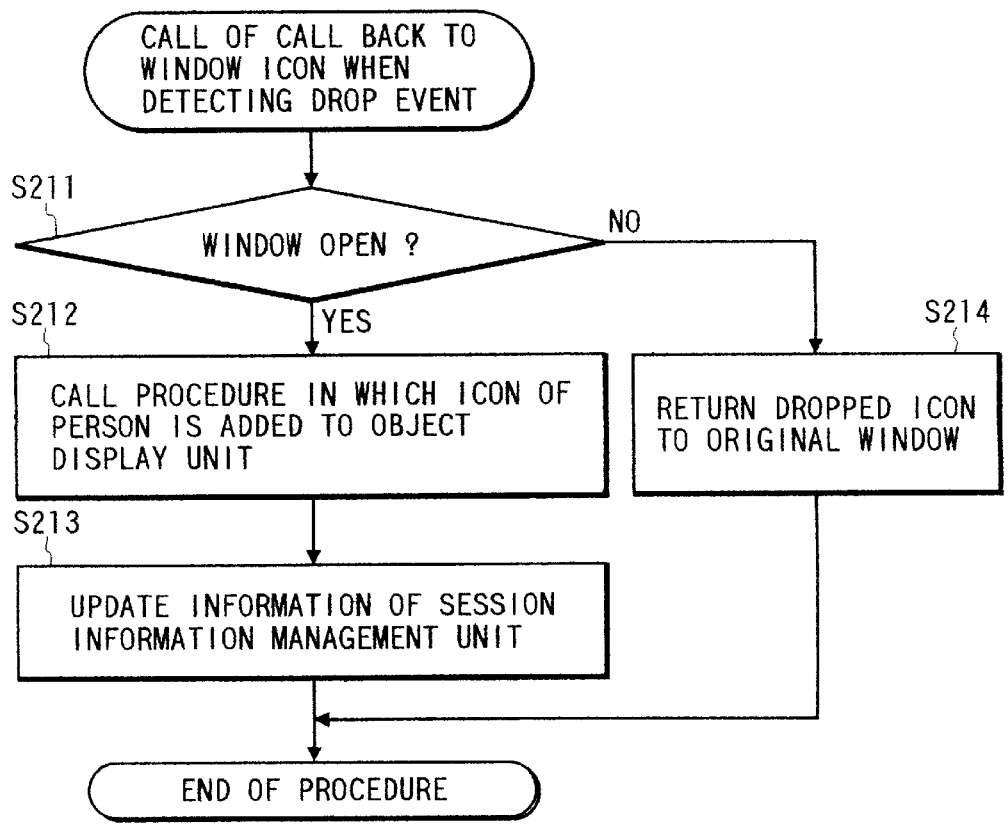
FIG. 21 is a flowchart of processing for calling back a drop event to a window icon.

FIG. 21 is a call back routine that is activated when a drop event at the window icon of the conversation session object is detected.

At step S211, a check is performed to determine whether or not the window is open. When the window is open, at step S212 the procedure 1933 is called for adding a person's icon to the display section of the conversation session object. At step S213, the information held by the session information management unit 16 is updated (knowledge concerning the situation is available).

When the window is not opened, at step S214, the icon that is dropped is not accepted and is returned to the original window (a request for knowledge concerning the situation is rejected).

Figure 22:
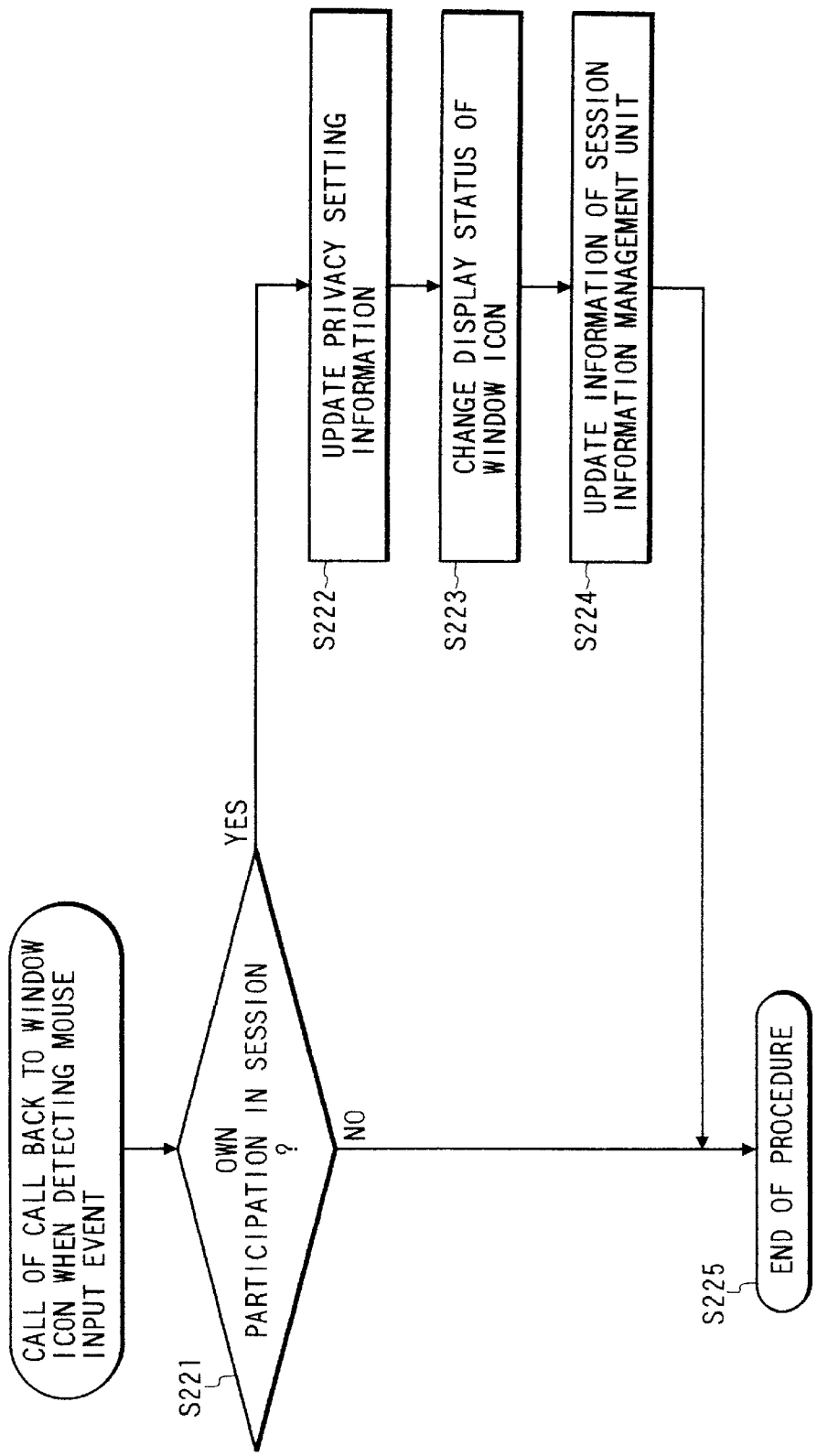
FIG. 22 is a flowchart of the processing for calling back a mouse input event for a window icon.

FIG. 22 is a call back routine that is activated when a mouse input event at a window icon is detected.

First, at step S221, a check is performed to determine whether or not a user is himself present at the session. When the user is present, at step S222, the privacy setting information 1920 is updated. At step S223, the procedure 1918 is called and the display state of the window icon is changed. In other words, the open and closed states of the window are cyclically switched. At step S224, the information held by the session information management unit 16 is updated.

When the user is not present at the session, he or she terminates the procedure without performing further processing (no change occurs).

Figure 23:
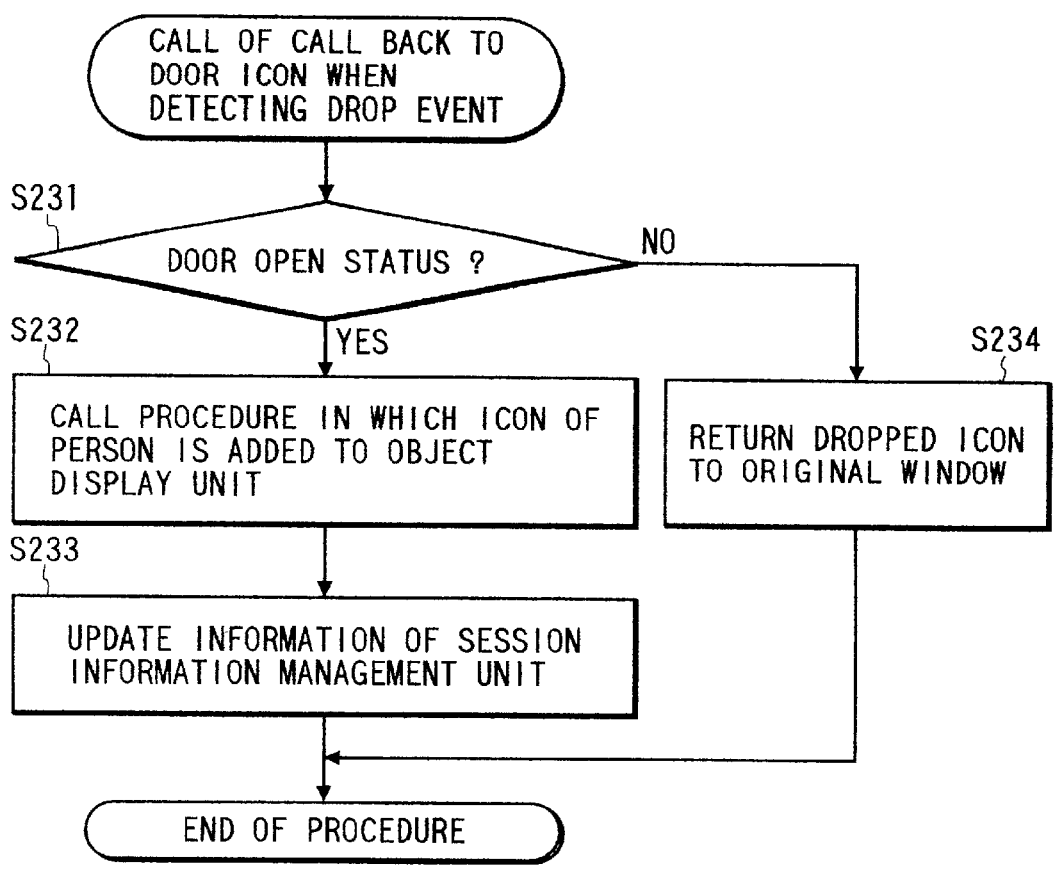
FIG. 23 is a flowchart of the processing for calling back a drop event for a door icon.

FIG. 23 is a call back routine that is activated when the drop event at a door icon is detected. It should be noted that, since a person's icon is not included in the door icon, the call back function for the drag event is not registered. First, at step S231 a check is performed to determine whether or not the door is open. When the door is open (a user can participate in the session), at step S232 the procedure 1933 is called for adding a person's icon to the display section for the conversation session object. At step S233, the information held by the session information management unit 16 is updated.

When the door is not open, at step S234 the icon that is dropped is not accepted and is returned to its original window (no change occurs).

Figure 24:
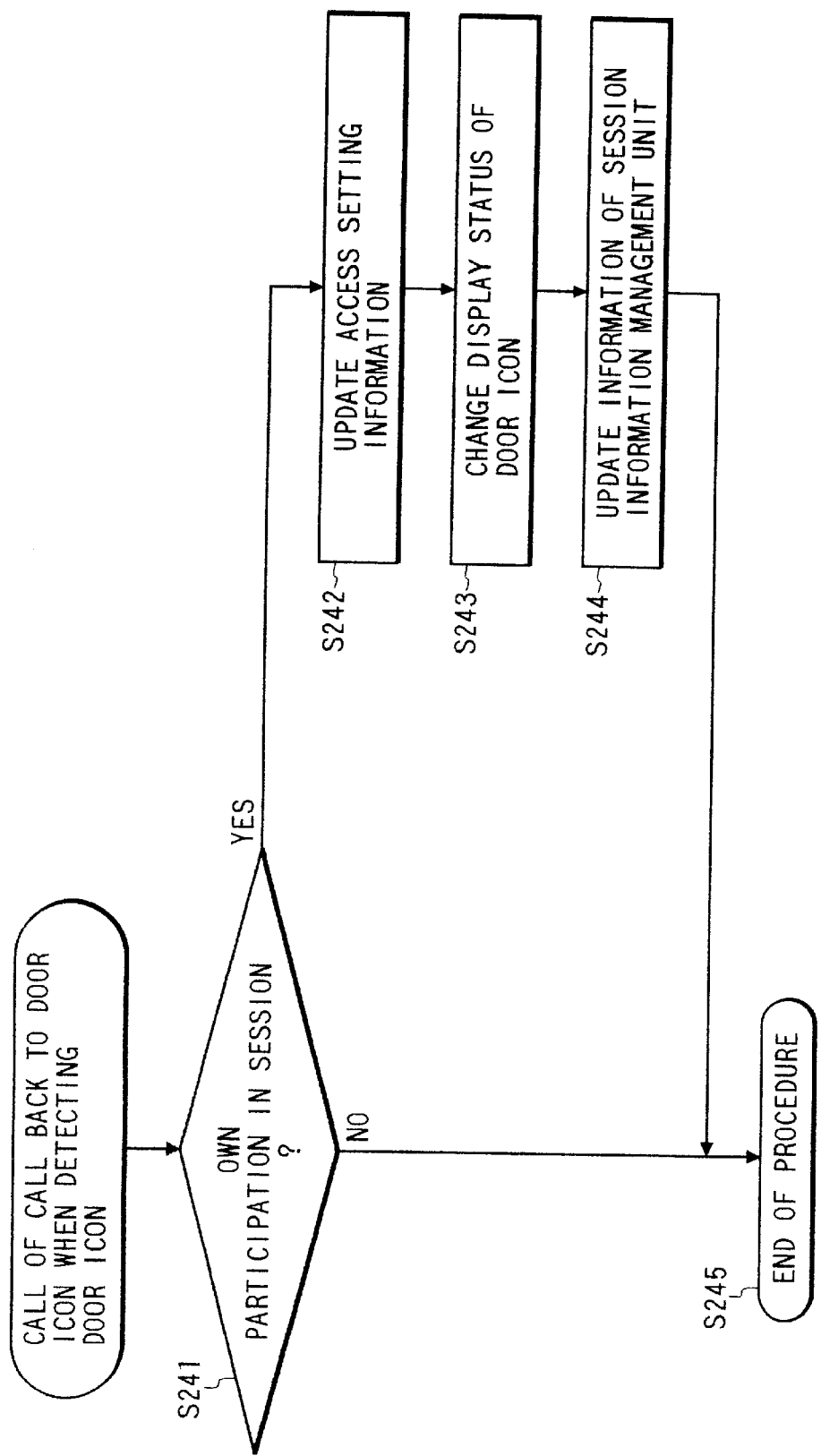
FIG. 24 is a flowchart of the processing for calling back a mouse input event for a door icon.

FIG. 24 is a call back routine that is activated when a mouse input event at a door icon is detected.

First, at step S241, a check is performed to determine whether or not a user is himself present at the session. When the user is present, at step S242, the access setting information 1919 is updated. At step S243, the procedure 1917 is called and the display state of the door icon is changed. In other words, the open and closed states of the door are cyclically switched. At step S244, the information held by the session information management unit 16 is updated.

When the user is not present at the session, he or she terminates the procedure without performing any further processing (no change occurs).

For a call back function that is to be registered when a lecture assembly session object is generated, the procedure 1943 is called for adding a participant and the procedure 1944 is called for extinguishing the participant, instead of the respective procedures 1933 and 1934, for the call back function that is to be registered when the conversation session object is generated.

For a call back function that is to be registered when a private room session object is generated, the procedure 1923 is called for adding a participant and the procedure 1924 for extinguishing the participant, instead of the respective procedures 1933 and 1934, for the call back function that is to be registered when the conversation session object is generated.

In addition to the operation of the session information update detecting unit 14 in the first embodiment, a session information update detecting unit 14 in this embodiment performs a call back routine for accepting a session access information update event and a call back routine for accepting a session privacy information update event.

In the call back routine for accepting an access information update event, the access setting information 1919 for a session object that is indicated by a session identifier is set in order to update the access level for the selected session object, and the procedure 1917 for the access level operation unit in the object is called in order to update the display of the door icon.

In the call back routine for accepting a privacy information update event, the access setting information 1920 for a session object that is indicated by a session identifier is set in order to update the privacy level for the selected session object, and the procedure 1918 for the privacy level operation unit in the object is called in order to update the display of the door icon.

The control unit 15 performs event processing concerning the access management and the privacy management in addition to the operations performed by the control unit 15 in the first embodiment.

The operation of the session information management unit 16 is expanded to enable it to handle privacy management information and access management information, in addition to the operations performed by the session information management unit 16 in the first embodiment.

As is described above in the first and the second embodiments, various cooperating task performance systems can be handled by identical interfaces, and shifting between a plurality of cooperative tasks can be smoothly performed.

Since the access management procedure and the privacy management procedure are independently provided, the permission level for participating in a session and the permission level for obtaining knowledge concerning the situation in a session can be set for each session. A third party can obtain knowledge concerning the situation in a session without participating in the session.

Figure 25:
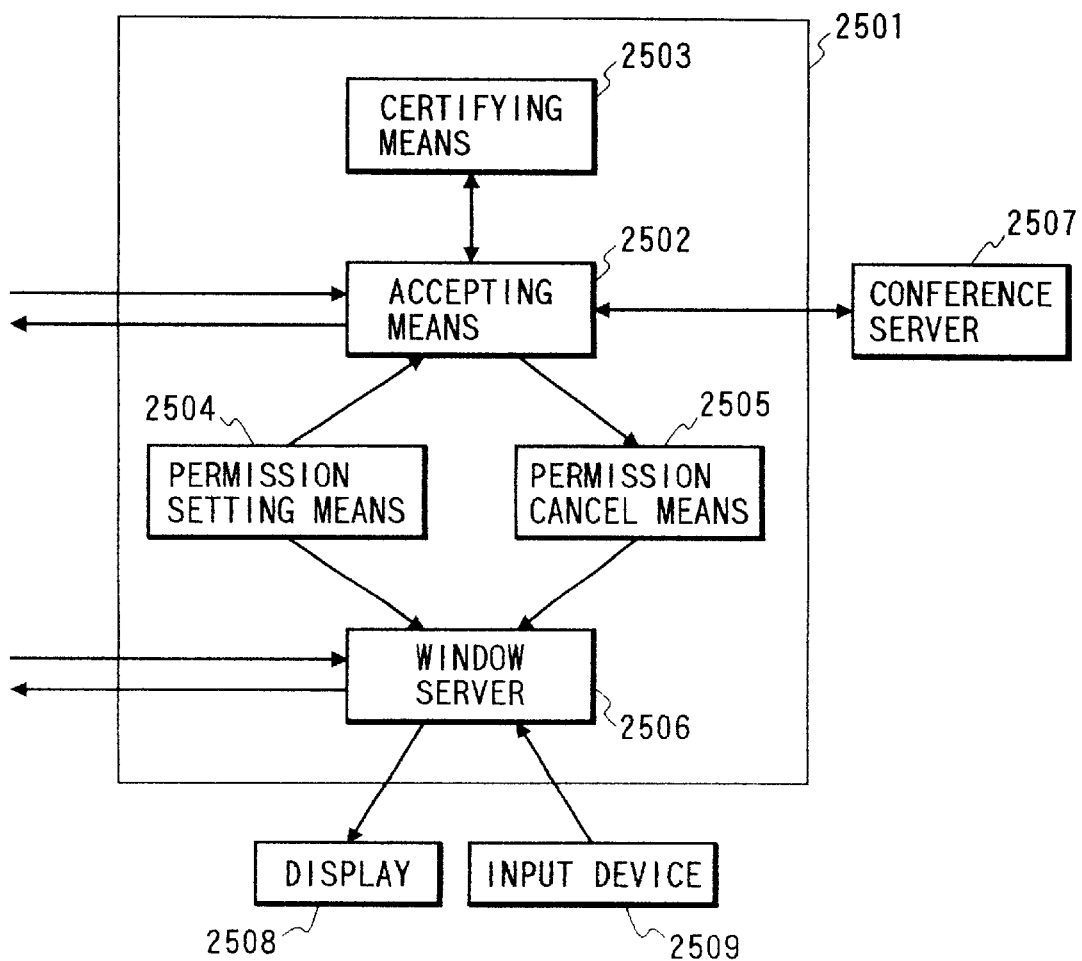
FIG. 25 is a block diagram illustrating a third embodiment of the present invention.

FIG. 25 is a block diagram illustrating a third embodiment of the present invention. A video conference is employed as one example session for the third embodiment.

In FIG. 25, a conference terminal 2501 is a communication device that is used for participation in a video conference. In the conference terminal 2501 are included an accepting means 2502, for receiving a request to participate in or to exit from a conference and for determining whether to approve or to reject the request; certifying means 2503, for certifying a requesting person and for notifying it of the decision by the accepting means 2502; permission setting means 2504, for, in consonance with the decision by the accepting means 2502, setting permission for a requesting person to externally operate a window server 2506; permission cancel means 2505, for, in consonance with the decision by the accepting means 2502, canceling the permission to externally operate the window server 2506 by a participant who requested permission to exit from a conference; and the window server 2506 for performing input/output operations, such as displaying data.

A conference server 2507 manages information concerning the names of participants in a conference and the name of a terminal host performing the task. Reference numeral 2508 denotes a display device and 2509 denotes an input device, such as a mouse or a keyboard, that a user manipulates.

The conference terminal 2501 accepts an external request for participating in a conference at the accepting means 2502, certifies the request transmitter by using the certifying means 2503, and determines whether the request should be approved or rejected. When the request is permitted, the permission setting means 2504 refers to the conference server 2507 as needed and sets the appropriate permission for external operation in the window server 2506.

Also, in the conference terminal 2501, the accepting means 2502 accepts a request from a participant to exit from the conference, and refers to the conference server 2507 as needed, and the permission cancel means 2505 refers to the conference server 2507 and sets, in the window server 2506, cancellation of the permission for an external operation.

FIG. 26 is a flowchart of the participation request processing for a video conference system.

In FIG. 26, S2601 is an acceptance request step for accepting a request from an external participant; S2602 is a certifying step for certifying a requesting person; S2603 is a decision step for checking whether or not the certification is performed correctly; S2604 is an automatic decision step for automatically determining whether to approve or reject the participation request based on participation permission list information that is set in advance by a user; S2605 is a decision step for determining whether or not a user should make a decision; S2606 is a user decision step for querying a user concerning the decision to approve or to reject a participation request from a person that is not included in the participation permission list; S2607 is a decision step for checking the decision made by a user; S2608 is a permission setting step for setting permission for an external operation in the window server 2606; and S2609 is a permission message transmission step for transmitting a message for participation permission to the requesting person; S2610 is a rejection message transmission step for transmitting a message for participation rejection to the requesting person.

The processing will now be described while referring to the flowchart in FIG. 26.

The operation of the system in this embodiment will be described for two situations: where when the user of the terminal is participating in a conference, a request to participate in the conference is received from another user; and where while the user of the terminal is not participating in a conference, a request to participate in the conference is received from another user.

At step S2601, a participation request is accepted from the outside by the accepting means 2502. At step S2602, the accepting means 2502 employs the certifying means 2503 to certify the person who submitted the request. If, at step S2603, the requesting person can not be certified, program control advances to rejection message transmission step S2610. When the requesting person is correctly certified, at step S2604, approval or rejection of the participation request is automatically determined. At this time, the accepting means 2502 refers to a specific file that is set in advance by the user that owns the terminal, and when the name of the requesting person is found in this file, the accepting means 2502 automatically approves the participation request. When, at step S2605, the request is approved, program control advances to permission setting step S2608.

When the determination for the requesting person can not be automatically performed, program control goes to user decision step S2606. At step S2606, a panel for requesting a decision by a user is opened on a screen of the display panel 2508, and approval or rejection of the request is determined based on the input by the user using the input device 2509. When, at step S2607, the user decides to approve the request, program control moves to permission setting step S2608. When the user decides to reject the request, program control goes to rejection message transmission step S2610.

At permission setting step S2608, when the user of the terminal is already participating in the conference, the accepting means 2502 instructs the conference server 2507 and the permission setting means 2504 to add the person who requested permission to participate in the conference. When the user of the terminal is not participating in the conference, the accepting means 2502 instructs the permission setting means 2504 to add all the conference members so that it can communicate with the members that are participating in the conference. The permission setting means 2504 instructs the window server 2506 to add a designated person or member as a person for whom the screen operation is permitted.

When the addition of all the members at the conference is instructed or when the host name of the target person is required for the following process, the permission setting means 2504 queries the conference server 2507 to obtain necessary information. The conference server 2507 is provided by a client/server system that has recently been commonly employed, and the permission setting means 2504 performs communication with the conference server 2507 by using a client function.

At step S2609, a message that the request has been approved is transmitted to the requesting person, and thereafter the participation request processing is terminated.

When the request for permission to participate is rejected, at rejection message transmission step S2610, a message that the request has been rejected is transmitted to the person requesting participation permission, and thereafter the participation request processing is terminated.

As for the contents of the communication passed from the permission setting means 2504 to the window server 2506, assuming that the window server 2506 is the X-Window Server that is often used in this field (UNIX), the commands that are associated with the X-Window System are employed and the person who is added and for whom the screen operation is permitted is represented by xhost hostname or xhost username@domain, where hostname denotes the host name of the terminal of a target person, and username@domain denotes the name of the target user and the name of the domain in which the user is managed.

The certifying means 2503 performs the certifying step S2602 by using public key encryption, for which a digital signature method is employed that is known in this technical field. With this method, a combination of a personal secret key and a public key is generated by a key server, and a transmitter transmits a message that is enciphered by using a secret key. On the reception side, the message is deciphered by using the public key of the transmitter and it is confirmed that the received message is the one output by the transmitter. A detailed description of this process can be found in "Trends in Enciphering Techniques and Security", Information Processing, Vol. 30, No. 8, pp. 892–901, or the like.

FIGS. 27A and 27B are diagrams showing panels that are opened on the screen of the display device 2508 at user decision step S2606. In FIG. 27A is shown a panel that is opened when the user of a terminal is participating in a conference, and in FIG. 27B is shown a panel for the other cases. Reference numerals 2701 through 2704 denote buttons that are displayed on the panel.

FIG. 28 is a flowchart of the detailed processing performed at the user decision step S2606.

At step S2801, when the user of a terminal is participating in a conference and a determination is to be made concerning a participation request by another member, the panel in FIG. 27B is opened. When whether or not the user of a terminal should be permitted to participate in the conference is to be determined as the result of a request submitted by another user, the panel in FIG. 27A is opened. In either case, the user is required effect the selection by depressing a button. When a participation button 2701 or a participation permission button 2703 is depressed, program control branches at step S2802 and moves to a participation permission process at step S2806. At step S2806, it is determined that the decision is made as participation is permitted and thereafter the processing is terminated. When a non-participation button 2702 or a participation rejection button 2704 is depressed, program control branches at step S2803 and moves to a participation rejection process at step S2805. At step S2805 it is determined that the participation request is rejected and thereafter the processing is terminated. When, at step S2804, no button is depressed within a set period of time, it is ascertained that the time allotted for a decision has expired, and at step S2805, it is determined that the participation request is rejected, and the processing is thereafter terminated.

The processing performed when a request for participation in the conference is submitted is as is described above.

Figure 29:
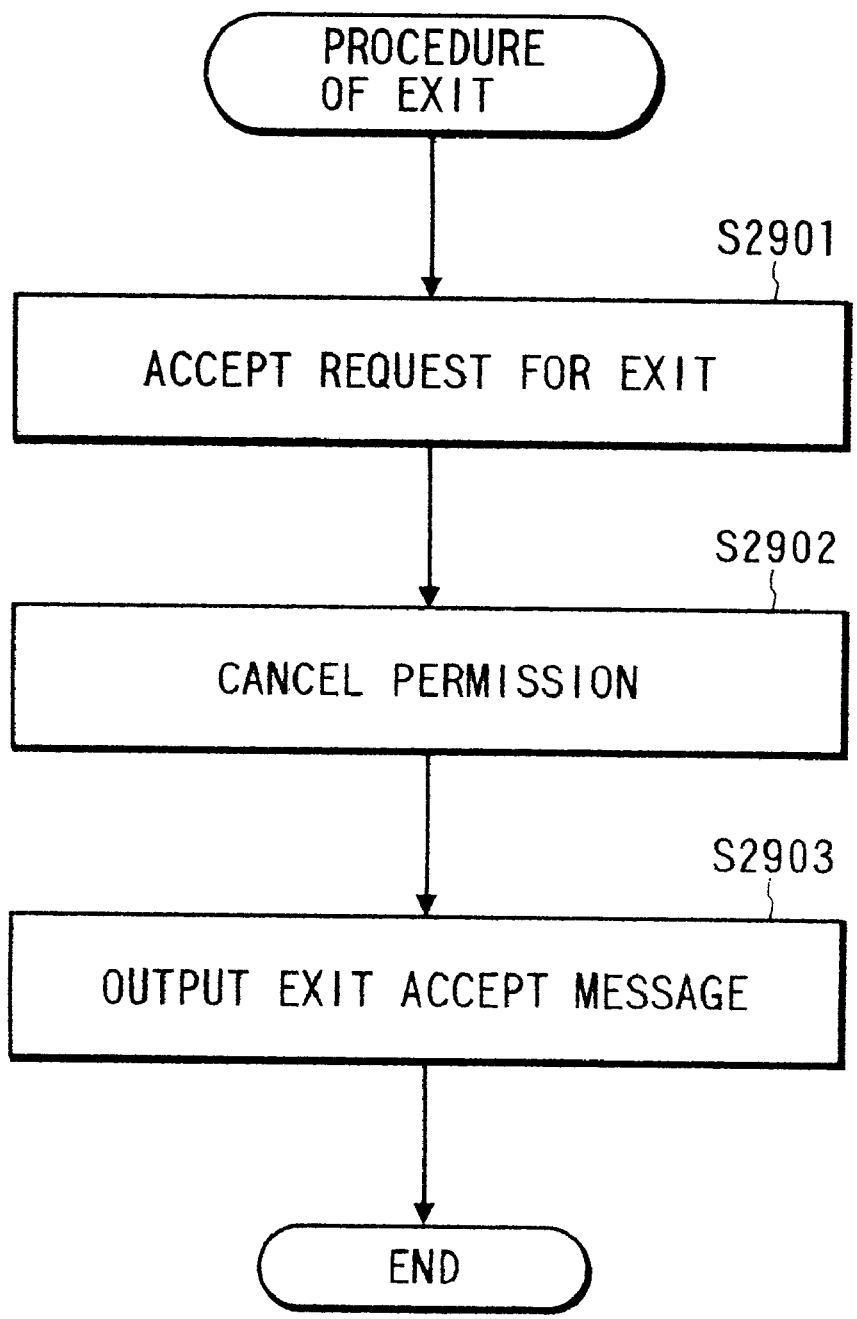
FIG. 29 is a flowchart of the processing for exiting from a conference.

FIG. 29 is a flowchart of the processing for a request to exit from a conference. Step S2901 is a step for accepting a request to exit a conference; step S2902 is a step for canceling permission to perform screen operations; and step S2903 is a step for transmitting an exit acceptance message.

When a participant exits a conference while it is in session or when the conference is terminated, an exit request is transmitted to individual terminals by appropriate means (not shown). In the conference terminal 2501, the accepting means receives an exit request from a participant, and at step S2902, the permission cancel means 2505 sets to the window server 2506 the cancel of permission of external operation to a person who requests the exit of the conference. When the host name of a target person is required, the permission cancel means 2505 inquires of the conference server 2507 to obtain necessary information.

After the permission is canceled at step S2902, at step S2903 an exit acceptance message is returned to the transmission source of the exit request. The processing is thereafter terminated.

Assuming that the window server 2506 is the X-Window Server that is often used in this field (UNIX), the commands that are associated with the X-Window System are employed and the person for whom permission for screen operations is canceled is represented by xhost-hostname or xhost-username@domain;

where hostname denotes the host name of the terminal of a target person, and username @ domain denotes the name of the target user and the name of the domain in which the user is managed.

Figure 30:
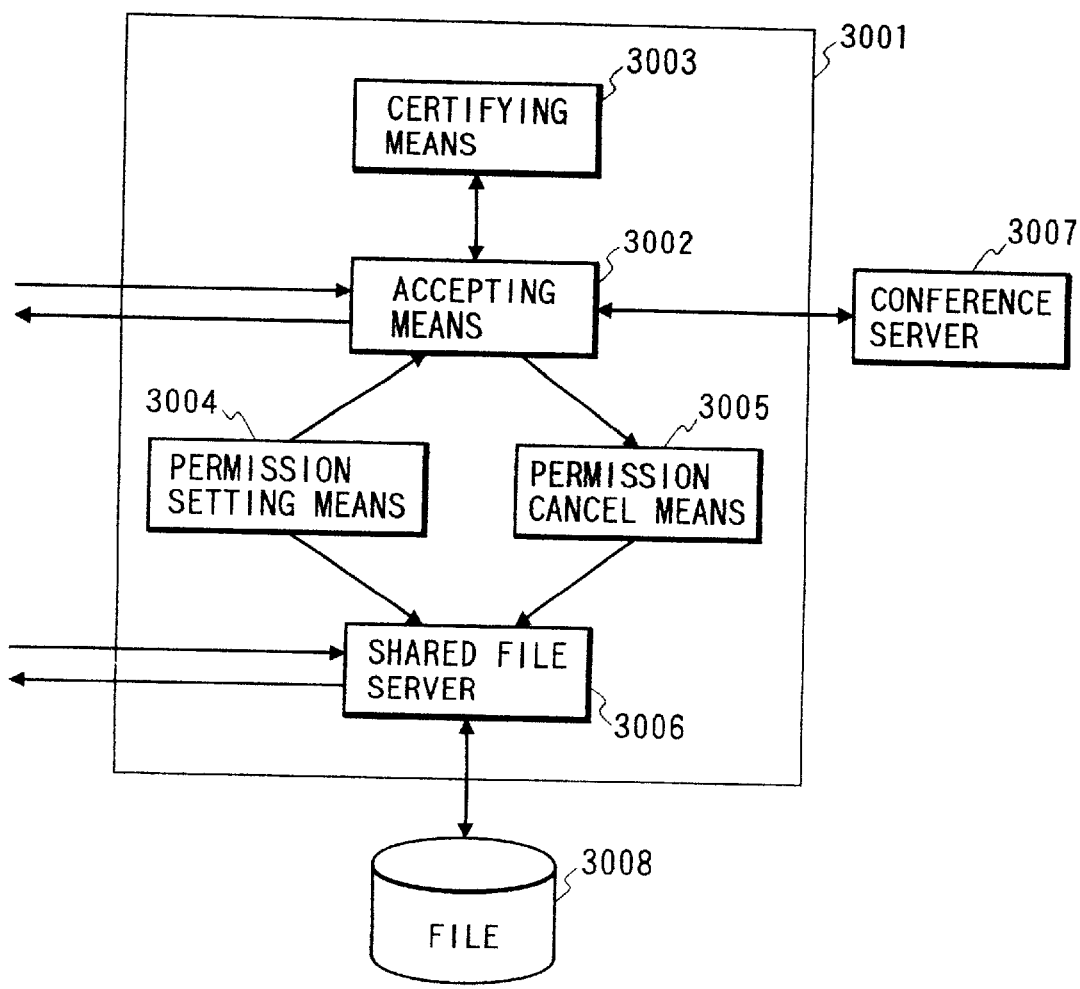
FIG. 30 is a block diagram illustrating a fourth embodiment of the present invention.

FIG. 30 is a block diagram illustrating a fourth embodiment of the present invention.

Although the third embodiment provides a security mechanism for the window server 2506 for display operations, this embodiment provides a security mechanism for a shared file server.

In FIG. 30, in a conference terminal 3001 that participates in a video conference are included accepting means 3002, for receiving and processing a request to participate in a conference and a request to exit from a conference; certifying means 3003, for certifying a requesting person; permission setting means 3004, for setting permission for external operation of the shared file server 3006 by the requesting person; and permission cancel means 3005, for canceling permission for external operation of the shared file server 3006 by the person submitting an exit request; the shared file server 3006 for performing input/output and transmission/reception of a data file; a conference server 3007 for managing information concerning conference participants and the host name of a terminal performing the task; and 3008, a file that is used by the shared file server 3006.

The processing will now be described.

In the conference terminal 3001, the accepting means 3002 receives an external request for permission to participate in a conference, and the certifying means 3003 certifies the requesting person to determine whether the request should be approved or rejected. When the request is approved, the permission setting means 3004 refers to the conference server 3007 as needed, and sets, at the shared file server 3006, permission for the requesting person to perform appropriate external operations.

Further, in the conference terminal 3001, the accepting means 3002 receives an exit request from a conference participant. The permission cancel means 3005 refers to the conference server 3007 as needed and sets, in the shared file server 3006, cancellation of the exit requesting person's permission to perform external operations.

When a conference participant exits which a conference is in session, or when the conference is terminated, an exit request is transmitted to individual terminals by appropriate means (not shown). Then, in the conference terminal 3001, the accepting means 3002 receives an exit request from a conference participant, and the permission cancel means 3005 sets, in the shared file server 3006, cancellation of the permission for the exit request transmitter to perform external operations. When the host name of the target person is required, the permission cancel means 3005 queries the conference server 3007 to obtain the necessary information. Thereafter, the exit acceptance message is returned to the exit requesting person and the processing is terminated.

The actual method for setting and canceling the permission for accessing the shared file server 3006 is effected by transmitting an appropriate command in accordance with the individual shared file installation methods.

For example, for an addition setup, add user username@domain [usergroup], and for a deletion and a cancellation, del user username@domain [usergroup], where usergroup can be omitted. When designated, a user in usergroup who is designated by username@domain can access a file for which accessing is enabled. Further, the usergroup can be so set that it is effective during the conference session.

With this arrangement, a conference participant can not only access the shared file server 3006 for a display, but can also easily share and access file information that is shared in a conference, and the file information can be securely protected from access by a person who is not participating in the conference.

According to the third and the fourth embodiments, provided is a communication device that is a conference terminal, in a video conference system, that can securely protect participants by using a server program and by performing secure communication.

A fifth embodiment will now be described.

In the third and the fourth embodiments, the determination performed by the accepting means 2502 for the approval or the rejection of a participation request is, depending on the situation, excessively complicated, or there may be no degree of freedom provided when a required setup is established. Very commonly, permission to participate is, for example, required for an extremely many large number of persons. In such as case, it is difficult for all the participants to be selected in advance. It may be more practical for a kind of black list to be prepared, listing the persons that may illegally attempt to use the service, and for special determination means is to be used to examine these persons.

In this embodiment, therefore, a user can set various determination means for permitting or rejecting requests to participate.

FIG. 31 is a flowchart of the processing for requesting permission to participate in the activities of a communication system when it is functioning as a video conference system. The structure of the system is the same as that shown in FIG. 25.

In FIG. 31, S3101 is an acceptance request step for accepting an externally submitted participation request; S3102 is a certifying step for certifying a requesting person; S3103 is a decision step for checking to see whether or not the certification is performed correctly; S3104 is an automatic rejection decision step for automatically deciding to reject the participation request based on first information that is set in advance by a user; S3105 is a decision step for determining whether or not automatic rejection of the request is appropriate; S3106 is an automatic permission decision step for automatically determining whether the participation request should be approved based on second information that is set in advance by a user; S3107 is a decision step for determining whether or not automatic approval of the request is appropriate; S3108 is a decision step for determining whether or not a user should make a decision; S3109 is a user decision step for querying a user concerning whether a participation request should be approved or rejected; S3110 is a decision step for determining whether or not the participation request is approved by the user; S3111 is a permission setting step for setting the window server to provide permission for external operations, and transmitting a message to the requesting person that the participation permission has been granted; and S3112 is a participation rejection step for performing participation request rejection processing, such as transmitting a message to the requesting person that the participation permission has not been granted.

S3113 is a decision step for determining whether or not a confirmation process for a user has been performed when the request is rejected as the result of the automatic decision process; S3114 is a user decision step for acquiring a user's confirmation for the requesting person whose request has been automatically rejected; S3115 is a decision step for determining whether or not the request is approved; S3116 is a decision step for determining whether or not a confirmation process by a user should be performed when the request is approved as a result of the automatic decision process; S3117 is a user decision step for acquiring a user's confirmation for the requesting person whose request has been automatically approved; and S3118 is a decision step for determining whether or not the request has been approved.

The processing will now be explained while referring to the flowchart in FIG. 31.

At step S3101, an external participation request is accepted by accepting means 2502. At step S3102, the accepting means 2502 employs certifying means 2503 to certify a person who submitted the request. If, at step S3003, the requesting person can not be certified, program control advances to participation rejection step S3112. When the request transmitter is certified correctly, at step S3104, automatic determination of whether the request should be rejected is performed. At this time, the accepting means 2502 refers to a first file that a user has set in advance, and when the name of the requesting person is listed in this file, the , accepting means 2502 automatically rejects the participation. When, at step S3105, the participation is rejected, program control advances to decision step S3113. At step S3113, data that designate the necessity for performing confirmation processing relative to the automatic rejection are employed to determine whether or not the confirmation processing is required. When the confirmation processing is required, program control moves to user decision step S3114. When the confirmation processing is not required, program control moves to request rejection step S3112. At user decision step S3114, the name of the requesting person and the fact that the request has been automatically rejected are displayed for the user and the user is requested to confirm the rejection. When, at step S3115, the rejection is confirmed, program control goes to request rejection step S3112. When the rejection is not confirmed, program control goes to request permission step S3111.

When, at step S3105, the result of the determination is that the participation request is not rejected, at step S3106, the participation request is automatically approved. In this case, the accepting means 2502 refers to a second file that the user of the terminal 2501 has set in advance. When the name of the requesting person is listed in this file, the participation request is automatically approved. When, at step S3107, the result of the determination is that the participation request is approved, program control goes to step S3116. At step S3116, data that are used to determine whether confirmation of the automatic decision to grant permission are employed to determine whether or not confirmation of the decision is required. When confirmation is required, program control moves to user decision step S3117. When confirmation is not required, program control moves to request permission step S3111. At user decision step S3117, the name of the requesting person and the fact that the request was automatically approved are displayed for the user and the user is requested to confirm the decision. When, at step S3118, the decision is confirmed, program control goes to request permission step S3111. When the decision is not confirmed, program control goes to request rejection step S3112.

If, at step S3107, automatic determination can not be performed, at step S3108 data that are used to determine whether the user should make a determination are referred to, and it is decided whether or not the user should make a determination. When the user is not requested to make a determination, program control moves to request rejection step S3112. When it is decided that the user should make a determination, program control goes to user decision step S3109. At step S3109, the panel for requesting a user to make a determination is displayed on a terminal screen, and approval or rejection is determined based on the input by the user. If, at step S3110, the result of the determination that the request for participation is approved, program control goes to step S3111. When the result of the determination is that the request for participation is rejected, program control goes to request rejection step S3112.

At request permission step S3111, when the user of the terminal 2501 is already participating in the conference, the accepting means 2502 instructs conference server 2507 and permission setting means 2504 to add the person who requested permission to participate in the conference. When the user of the terminal 2501 is not participating in the conference, the accepting means 2502 instructs the permission setting means 2504 to add all the conference members. The permission setting means 2504 instructs the window server 2506 to add a designated person or member as a person for whom the screen operation is permitted. Then, a participation permission message is transmitted to the requesting person, and the participation requesting processing is thereafter terminated. When the participation request is rejected, at request rejection step S3112, a message that the request was rejected is transmitted to the requesting person and the participation request processing is terminated.

It should be noted that AnyPerson, which means all the members, can be designated in the first and the second files that are used for automatic determination.

Through this processing, the automatic rejection, the automatic approval, and confirmation procedures for them can be flexibly set. For example, when the first file for automatic rejection is blank, and when the user decision at step S3108 is not required and confirmation at step S3116 is required, members described only in the second file are accessed, and the user confirmation can be performed at the time of accessing. If, in this case, AnyPerson is designated in the second file, the application condition for the common service that can be applied for anybody can be monitored.

On the other hand, when the second file for automatic permission is AnyPerson, and when the user decision at step S3116 is required and the confirmation at step S3113 is required, the rejection of requests for access by the members described in the first file can be confirmed. In this case, the first file can function as a black list and only the accessing by persons on which special restrictions have been placed can be monitored.

Therefore, according to the embodiments, provided is not only a service that users of a communication system, such as conference participants, can easily acquire by using a conventional server, and that can be securely protected from being accessed by a third person, but also flexible user management can be performed by setting up procedures for performing automatic rejections and automatic approvals, and by providing procedures for obtaining user's confirmations and user's decisions.

In the third through the fifth embodiments, the present invention is applied to a video conference system. However, the present invention is not limited to this system, and it can be applied in a case where a predetermined terminal controls access for a plurality of terminals connected to a network.

As is described above, provided is a service that users of a communication system, such as conference participants, can easily acquire by using a conventional server, and that can be securely protected from being accessed by a third person.

In addition, flexible user management can be performed by setting up procedures for performing automatic rejections and automatic approvals and by providing procedures for obtaining user's confirmations and user's decisions. Further, by using the window server or the file server, an access by a conference participant of a screen display or of an input/output file can be permitted while maintaining adequate security.

Modification

The above described embodiments may be applied to a system that is constituted by a plurality of devices, or to an apparatus that is constituted by a single device.

Included in the scope of the above described embodiments is included a processing method for storing a program, on a storage medium, that can operate the structures in the aforementioned embodiments to perform the functions of the embodiments, and for carrying out the embodiments according to the program that is stored on the storage medium. Further, the storage medium on which the program is stored is also included in the above embodiments.

Such a storage medium can be a floppy disk, a hard disk, an optical disk, a magneto-optical disk, a CD-ROM, a magnetic tape, a nonvolatile memory card, or a ROM.

In addition, the processing method is not limited to the one in accordance with which a process is performed by a single program that is stored on a storage medium, for included within the scope of the above embodiment is a processing method that provides for the operation of a program on an OS that can, in cooperation with the functions of other software or of an expansion board, carry out the provisions of the above described embodiment.

What is claimed is:

1. A communication apparatus comprising:
   a certification circuit arranged to certify a requesting person who requests to participate in mutual communication activities;
   a determination circuit arranged to accept a request to participate in the mutual communication activities and to determine whether the request to participate is approved or rejected, wherein said determination circuit makes a determination as to whether a request by a requesting person certified by said certification circuit is approved or rejected,
   wherein said determination circuit searches a list, which is prepared in advance for the requesting person, and, therewith, a user determines whether or not the request to participate is approved, and
   wherein said determination circuit includes: i) an automatic rejection determination circuit arranged to automatically determine, in consonance with the list that is prepared in advance, whether participation by the requesting person is inappropriate; ii) an automatic permission determination circuit arranged to automatically determine, in consonance with another list that is prepared in advance, whether or not participation by the requesting person is appropriate; and iii) a participation determination circuit arranged to, when a requesting person is not found on either of the lists, display an identity of the requesting person, and to, in consonance with input data indicating an approval or a rejection of the request to participate, determine whether participation by the requesting person is permitted or is denied;
   a programmed circuit that utilizes a predetermined program to perform an input/output operation from an external communication apparatus; and
   a permission setting circuit arranged to, in consonance with a decision to approve a request to participate made by said determination circuit, set that a requesting person who submitted the request to participate is permitted to perform input/output operations using said programmed circuit.

2. A communication apparatus according to claim 1, further comprising:
   an acceptance circuit arranged to accept a participation cancellation request from a participant in the mutual communication activities; and a permission cancellation circuit arranged to, in consonance with an acceptance of the participation cancellation request by said acceptance circuit, cancel permission, for the requesting person who issues the participation cancellation request, to perform the input/output operations using said programmed circuit.

3. A communication apparatus according to claim 1, further comprising a confirmation circuit arranged to confirm a result of an automatic determination that participation by the requesting person is inappropriate or that participation by the requesting person is appropriate.

4. A communication apparatus according to claim 1, further comprising a designation circuit arranged to designate that the participation determination circuit is not used.

5. A communication apparatus according to claim 1, wherein the predetermined program is a server program.

6. A communication apparatus according to claim 1, wherein the predetermined program is a window server program.

7. A communication apparatus according to claim 1, wherein the predetermined program is a shared file server program.

8. A communication method, comprising:
   a certification step of certifying a requesting person who requests to participate in mutual communication activities;
   a determination step of accepting a request to participate in the mutual communication activities and determining whether the request to participate is approved or rejected, wherein a determination is made as to whether a request by a requesting person certified in said certification step is approved or rejected in said determination step,
   wherein said determination step searches a list, which is prepared in advance for the requesting person, and, therewith, a user determines whether or not the request to participate is approved, and
   wherein said determination step includes: i) an automatic rejection determination step of automatically deciding, in consonance with the list that is prepared in advance, whether participation by the requesting person is inappropriate; ii) an automatic permission determination step of automatically deciding, in consonance with another list that is prepared in advance, whether or not participation by the requesting person is appropriate; and iii) a participation determination step of, when a requesting person is not found on either of the lists, displaying an identity of the requesting person and, in consonance with input data indicating an approval or a rejection of the request to participate, determining whether participation by the requesting person is permitted or is denied;
   an input/output step of performing, using a predetermined program, an input/output operation from an external communication apparatus; and
   a permission setting step of, in consonance with a decision to approve a request to participate made in said determination step, setting that a requesting person who submitted the request to participate is permitted to perform input/output operations using the predetermined program.

9. A communication method according to claim 8, further comprising:
   an acceptance step of accepting a participation cancellation request from a participant in the mutual communication activities; and
   in consonance with an acceptance of the participation cancellation request in said acceptance step, canceling permission, for the requesting person who issues the participation cancellation request, to perform the input/output operations using the predetermined program.

10. A communication method according to claim 8, further comprising a confirmation step of confirming a result of an automatic determination that participation by the requesting person is inappropriate or that participation of the requesting person is appropriate.

11. A communication method according to claim 8, further comprising a designation step of designating that the participation determination step is not used.

12. A communication method according to claim 8, wherein the predetermined program is a server program.

13. A communication method according to claim 8, wherein the predetermined program is a window server program.

14. A communication method according to claim 8, wherein the predetermined program is a shared file server program.

15. A computer-readable memory storing a program for implementing a communication method, the program comprising:
   program code for a certification step of certifying a requesting person who requests to participate in mutual communication activities;
   program code for an determination step of accepting a request to participate in mutual communication activities and determining whether the request to participate is approved or rejected, wherein a determination is made as to whether a request by a requesting person certified in the certification step is approved or rejected in the determination step,
   wherein the determination step searches a list, which is prepared in advance for the requesting person, and, therewith, a user determines whether or not the request to participate is approved, and
   wherein the determination step includes: i) an automatic rejection determination step of automatically deciding, in consonance with the list that is prepared in advance, whether participation by the requesting person is inappropriate; ii) an automatic permission determination step of automatically deciding, in consonance with another list that is prepared in advance, whether or not participation by the requesting person is appropriate; and iii) a participation determination step of, when a requesting person is not found on either of the lists, displaying an identity of the requesting person and, in consonance with input data indicating an approval or a rejection of the request to participate, determining whether participation by the requesting person is permitted or is denied;
   program code for an input/output step of performing, using a predetermined program, an input/output operation from an external communication apparatus; and
   program code for a permission setting step of setting, in consonance with a decision to approve a request to participate, that a requesting person who submitted the request to participate is permitted to perform input/output operations using the predetermined program.

* * * * *

UNITED STATES PATENT AND TRADEMARK OFFICE
CERTIFICATE OF CORRECTION

PATENT NO.   : 6,286,034 B1
DATED         : September 4, 2001
INVENTOR(S)  : Hiroaki Sato et al.

It is certified that error appears in the above-identified patent and that said Letters Patent is hereby corrected as shown below:

Column 8,
Line 20, "person 's" should read -- person's --.
Line 35, "above described" should read -- above-described --.

Column 9,
Line 33, "person 's" should read -- person's --.

Column 10,
Line 36, "user 's" should read -- user's --.

Column 11,
Line 19, "a" should read -- an --.

Column 13,
Line 53, "statue" should read -- status --.

Column 16,
Line 54, "person 's" should read -- person's --.

Column 21,
Line 31, "is as is" should read -- is as --.

Column 22,
Line 34, "which" should be deleted.

Column 23,
Line 11, "as" should read -- a --.

Column 24,
Line 13, "the ," should read -- the --.

Column 25,
Line 65, "above described" should read -- above-described --.

UNITED STATES PATENT AND TRADEMARK OFFICE
CERTIFICATE OF CORRECTION

PATENT NO. : 6,286,034 B1
DATED : September 4, 2001
INVENTOR(S) : Hiroaki Sato et al.

It is certified that error appears in the above-identified patent and that said Letters Patent is hereby corrected as shown below:

Column 26,
Line 1, "above described" should read -- above-described --.
Line 16, "embodiment" should read -- embodiments --.
Line 20, "above described embodiment" should read -- above-described embodiments --.

Column 28,
Line 29, "an" should read -- a --.

Signed and Sealed this

Second Day of April, 2002

Attest:

JAMES E. ROGAN
*Attesting Officer*     *Director of the United States Patent and Trademark Office*